United States Patent
Ishikawa

(10) Patent No.: US 8,131,023 B2
(45) Date of Patent: Mar. 6, 2012

(54) MONITORING SYSTEM FOR ACQUIRING A FACIAL IMAGE AND PERFORMING MONITORING PROCESSING, METHOD, INFORMATION PROCESSING DEVICE, AND PROGRAM THEREOF

(75) Inventor: Takamitsu Ishikawa, Ichinomiya (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 872 days.

(21) Appl. No.: 12/044,385

(22) Filed: Mar. 7, 2008

(65) Prior Publication Data

US 2008/0317349 A1 Dec. 25, 2008

(30) Foreign Application Priority Data

Jun. 25, 2007 (JP) ................................. 2007-166885

(51) Int. Cl.
*G06K 9/00* (2006.01)
(52) U.S. Cl. ........ 382/118; 302/190; 302/115; 302/103; 302/199; 348/22; 348/207; 348/207.1; 348/211.1; 348/211.2; 348/211.3
(58) Field of Classification Search .................. 382/118, 382/190, 115, 103, 199; 348/22, 207, 207.1, 348/211.1, 211.2, 211.3, 207.2, 207.3
See application file for complete search history.

(56) References Cited

U.S. PATENT DOCUMENTS

2004/0008873 A1* 1/2004 Sogo et al. .................... 382/118
2004/0165754 A1* 8/2004 Tabata .......................... 382/118

FOREIGN PATENT DOCUMENTS

JP 2003-003613 A 1/2003

OTHER PUBLICATIONS

Patent Abstracts of Japan, Publication No. 2003-003613, Publication Date: Jan. 8, 2003, 1 page.

* cited by examiner

*Primary Examiner* — Mike Rahmjoo
(74) *Attorney, Agent, or Firm* — Osha • Liang LLP

(57) ABSTRACT

The present invention decreases the processing load of a server related to a collation processing system which is implemented by a server which performs collation processing with a registered facial image. An image acquisition section acquires the facial image of an individual who approaches a game machine as a facial image of a collation object, a local biological information DB stores a predetermined number of facial images of a collation object, a condition extraction section extracts condition information which indicates conditions to extract characteristic value of the facial image from the acquired facial image of the collation object and a stored facial image of the collation object, a comparison section compares the condition information on the acquired facial image and the condition information on the stored facial image of the collation object based on the extracted condition information, and the communication section sends the acquired facial image to the monitoring device when the condition information on the acquired facial image is better than the condition information on the stored facial image of the collation object. The present invention can be applied to monitoring systems.

5 Claims, 17 Drawing Sheets

MONITORING SYSTEM FOR ACQUIRING A FACIAL IMAGE AND PERFORMING MONITORING PROCESSING, METHOD, INFORMATION PROCESSING DEVICE, AND PROGRAM THEREOF

BACKGROUND OF THE INVENTION

1. Field of the Invention

The present invention relates to a monitoring system and method, information processing device, and program, and more particularly to a monitoring system and method, information processing device, and program which decrease the processing load of a server related to a collation processing system implemented by a server which performs collation processing between facial images captured by a plurality of monitoring cameras and facial images in a database, and improve the collation accuracy.

2. Description of the Related Art

The technology for executing collation processing based on facial images by storing facial images in a database, determining similarity with a captured facial image and searching facial images of which similarity is higher than a predetermined value, and managing data based on the facial images using the collation result, is becoming popular.

As a technology for managing data based on facial images, a technology for improving collation accuracy using a first server and a second server, for example, has been proposed (Japanese Patent Application Laid-Open No. 2001-187249).

If the above mentioned method, which aims to improve collation accuracy, is used, however, and if terminal devices are installed at each game machine of a game center, and facial images are acquired and supplied to the server, a large volume of facial image data is supplied from terminal devices to the server, the server accesses the facial image database and repeats collation processing between an enormous volume of facial images and the database, so the processing load of the server increases, and as a result collating processing time elapses and real-time processing is affected.

For example, in the case of a game center having 1000 game machine units, where 20% of players are "switching machines", "temporarily leaving", "coming" and "leaving" within one hour, collation processing is required for about 200 players. In other words, collation processing for 2400 players is required if the game center operates 12 hours a day. For "switching game machines", "coming" and "leaving", collation must be performed on the server to manage customers by facial images, but for "temporarily leaving", as in going to the restroom, purchasing food and drink, eating and making phone calls, it is unnecessary to supply data on facial images to the server and perform collation, since the same player returns.

Also in collation, similarity of a facial image registered in a database and a facial image of an individual is provided as a score, and if the score exceeds a threshold, the "individual" is identified as the actual person, but facial images which can easily be used for facial image collation, in terms of "direction of face (up, down)", "inclination of face" and "brightness of face" must be searched and registered in a database.

However in the current situation, facial images in a facial image database are not updated to optimum facial images, and any images that are captured as facial images are registered as the facial images of an individual.

Also a system of managing data based on facial images is comprised of a terminal device for capturing facial images and a server, but if communication with a server is interrupted for a predetermined period, the terminal device must either discard the captured facial images, or otherwise continue storing facial images without end, which may crash the system.

In any case, in the above mentioned data management system which has a database of facial images, processing greatly depends on the server which executes collation processing, which could increase load and decrease real-time processing and accuracy of collation processing based on facial images.

SUMMARY OF THE INVENTION

With the foregoing in view, it is an object of the present invention to supply facial images to a server after selecting facial images to be supplied to the server, by acquiring facial images of an individual captured by a camera, and collating them with facial images of an individual of which volume is smaller than the database, using a terminal device having a collation function that is different from the server, so that the load of collation processing on the server is decreased, and as a result, collation processing based on facial images can be implemented in real-time and at high accuracy.

A monitoring system according to one aspect of the present invention is a monitoring system comprising an information processing device for acquiring a facial image, and a monitoring device for performing monitoring processing based on an image supplied from the information processing device, wherein the information processing device comprises: acquisition means for acquiring the facial image of an individual who approaches a game machine as a facial image of a collation object; collation object storage means for storing a predetermined number of facial images of the collation object; condition information extraction means for extracting condition information which indicates conditions for extracting characteristic value of the facial image based on the facial image of the collation object acquired by the acquisition means and the facial image of the collation object stored by the collation object storage means; condition information comparison means for comparing the condition information on the facial image acquired by the acquisition means and the condition information on the facial image of the collation object stored by the collation object storage means, based on the condition information extracted by the condition information extraction means; and transmission means for sending the facial image acquired by the acquisition means to the monitoring device when the condition information on the facial image acquired by the acquisition means is better than the condition information on the facial image of the collation object stored by the collation object storage means, and the monitoring device comprises: reception means for receiving the facial image of the collation object which is sent by the transmission means; storage means for storing the facial image of the registered individuals in a registered individual database; first similarity collation means for calculating the similarity of the facial image of the collation object received by the reception means and the facial image of the registered individual stored by the storage means, and performing collation; first similarity judgment means for judging whether the facial image of the collation object is the facial image of the registered individual by comparing the similarity which is the collation result of the first similarity collation means and a predetermined threshold; and notification means for notifying that the collation object is the registered individual when the facial image of the collation object is the facial image of the registered individual based on the judgment result of the first similarity judgment means.

The information processing device may further comprise image capturing means for capturing images, and facial image extraction means for extracting a facial image of the collation object from the images captured by the capturing means, and the monitoring device may further comprise characteristic value extraction means for extracting characteristic value from the facial image of the collation object, the reception means may receive the facial image of the collation object extracted by the facial image extraction means, and the first similarity collation means may calculate similarity using the facial image of the collation object received by the reception means and characteristic value of the facial image of a registered individual stored in the storage means, and collate a facial image of the collation object received by the reception means and the facial image of the registered individual stored in the storage means.

The monitoring system may further comprise update means, wherein when the condition information on the facial image acquired by the acquisition means is better than the condition information on the facial image of the collation object stored in the collation object storage means according to the condition information comparison means, the collation object storage section is updated by deleting a facial image of which the condition information is lowest from the predetermined number of facial images stored by the collation object storage means, and storing the facial image acquired by the acquisition means as a facial image of the collation object.

The information processing device may further comprise a second similarity collation means for calculating similarity of the facial image of the collation object acquired by the acquisition means and the facial image of the collation object stored by the collation object storage means, and performing collation, and second similarity judgment means for judging whether the facial image of the collation object acquired by the acquisition means is the facial image of the collation object stored in the collation object storage means based on the comparison of the similarity which is the collation result by the second similarity collation means and a predetermined threshold, the condition information comparison means compares the condition information on the facial image acquired by the acquisition means and the condition information on the facial image of the collation object stored by the collation object stored means, based on the condition information extracted by the condition information extraction means when the facial image of the collation object acquired by the acquisition means is the facial image of the collation object stored in the collation object storage means according to the judgment result of the second similarity judgment means, and the transmission means sends the facial image acquired by the acquisition means to the monitoring device when the condition information on the facial image acquired by the acquisition means is better than the condition information on the facial image of the collation object stored in the collation object storage means according to the condition information comparison means.

A monitoring method for a monitoring system according to an aspect of the present invention is a monitoring method for a monitoring system comprising an information processing device for acquiring a facial image and a monitoring device for performing monitoring processing based on an image supplied from the information processing device, wherein a monitoring method of the information processing device comprises: an acquisition step of acquiring the facial image of an individual who approaches a game machine as a facial image of a collation object; a collation object storage step of storing a predetermined number of facial images of the collation object; a condition information extraction step of extracting condition information which indicates conditions for extracting characteristic value of the facial image based on the facial image of the collation object acquired by the acquisition step and the facial image of the collation object stored by the processing of the collation object storage step; a condition information comparison step of comparing the condition information on the facial image acquired by the processing of the acquisition step and the condition information on the facial image of the collation object stored by the processing of the collation object storage step based on the condition information extracted by the processing of the condition information extraction step; and a transmission step of sending the facial image acquired by the processing of the acquisition step to the monitoring device when the condition information on the facial image acquired by the processing of the acquisition step is better than the condition information on the facial image of the collation object stored by the processing of the collation object storage step according to the processing of the condition information comparison step, and the monitoring method of the monitoring device comprises: a reception step of receiving the facial image of the collation object which is sent by the processing of the transmission step; a storage step of storing the facial image of the registered individual in a registered individual database; a first similarity collation step of calculating the similarity of the facial image of the collation object received by the processing of the reception step and the facial image of the registered individual stored by the processing of the storage step, and performing collation; a first similarity judgment step of judging whether the facial image of the collation object is the facial image of the registered individual by comparing the similarity which is the collation result of the processing of the first similarity collation step and a predetermined threshold; and a notification step for notifying that the collation object is the registered individual when the facial image of the collation object is the facial image of the registered individual based on the judgment result in the processing of the first similarity judgment step.

A program according to an aspect of the present invention is a program for a computer which controls a monitoring system comprising an information processing device for acquiring a facial image and a monitoring device for performing monitoring processing based on an image supplied from the information processing device, wherein the program causes the computer which controls the information processing device to execute: an acquisition step of acquiring the facial image of an individual who approaches a game machine as a facial image of a collation object; a collation object storage step of storing a predetermined number of facial images of the collation object; a condition information extraction step of extracting condition information which indicates conditions for extracting characteristic value of the facial image based on the facial image of the collation object acquired by the processing of the acquisition step and the facial image of the collation object stored by the processing of the collation object storage step; a condition information comparison step of comparing the condition information on the facial image acquired by the processing of the acquisition step and the condition information on the facial image of the collation object stored by the processing of the collation object storage step based on the condition information extracted by the processing of the condition information extraction step; and a transmission step of sending the facial image acquired by the processing of the acquisition step to the monitoring device when the condition information on the facial image acquired by the processing of the acquisition step is better than the condition information on the facial image of the collation object stored by the processing of the collation object storage step according to the processing of the condition information comparison step, and wherein the program causes the computer which controls the monitoring device to execute: a reception step of receiving the facial image of the collation object which is sent by the processing of the transmission step; a storage step of storing the facial image of the registered individual in a registered individual database; a first similarity collation step of calculating the similarity of the facial image of the collation object received by the processing of the reception step and the facial image of the registered individual stored by the processing of the storage step, and performing collation; a first similarity judgment step of judging whether the facial image of the collation object is the facial image of the registered individual by comparing the similarity which is the collation result of the processing of the first similarity collation step and a predetermined threshold; and a notification step of notifying that the collation object is the registered individual when the facial image of the collation object is the facial image of the registered individual based on the judgment result in the processing of the first similarity judgment step.

An information processing device according to one aspect of the present invention comprises acquisition means for acquiring a facial image of an individual who approaches a game machine as a facial image of a collation object; collation object storage means for storing a predetermined number of facial images of the collation object; condition information extraction means for extracting condition information which indicates conditions for extracting characteristic value of the facial image based on the facial image of the collation object acquired by the acquisition means and the facial image of the collation object stored by the collation object storage means; condition information comparison means for comparing the condition information on the facial image acquired by the acquisition means and the condition information on the facial image of the collation object stored by the collation object storage means, based on the condition information extracted by the condition information extraction means; and transmission means for sending the facial image acquired by the acquisition means to the monitoring device when the condition information on the facial image acquired by the acquisition means is better than the condition information on the facial image of the collation object stored by the collation object storage means, according to the condition information comparison means.

In the monitoring system, method and program according to an aspect of the present invention, an information processing device of a monitoring system, which comprises an information processing device for acquiring a facial image and a monitoring device for performing monitoring processing based on an image supplied from the information processing device, acquires the facial image of an individual who approaches a game machine as a facial image of a collation object, stores a predetermined number of facial images of the collation object, extracts condition information which indicates conditions for extracting characteristic value of the facial image based on the acquired facial image of the collation object and the stored facial image of the collation object, compares the condition on the acquired facial image and the condition information on the stored facial image of the collation object based on the extracted condition information, and sends the acquired facial image to the monitoring device when the condition information on the acquired facial image is better than the condition information of the stored facial image of the collation object, and the monitoring device receives the transmitted facial image of the collation object, stores the facial image of the registered individual in a registered individual database, calculates similarity of the received facial image of the collation object and the stored facial image of the registered individual and performs collation, judges whether the facial image of the collation object is the facial image of the registered individual by comparing the similarity in the collation result and a predetermined threshold, and notifies that the collation object is the registered individual when the facial image of the collation object is the facial image of the registered individual.

An example of the information processing device in the monitoring system according to one aspect is an image processing unit, an example of the acquisition means for acquiring the facial image of an individual who approaches a game machine as a facial image of a collation object is an image acquisition section, an example of the collation object storage means for storing a predetermined number of facial images of the collation object is a local biological information DB, an example of the condition information extraction means for extracting condition information which indicates conditions for extracting characteristic value of the facial image based on the facial image of the collation object acquired by the acquisition means and the facial image of the collation object stored by the collation object storage means is a condition extraction section, an example of the condition information comparison means for comparing the condition information on the facial image acquired by the acquisition means and the condition information on the facial image of the collation object stored by the collation object storage means, based on the condition information extracted by the condition information extraction means is a comparison section, and an example of the transmission means for sending the facial image acquired by the acquisition means to the monitoring device when the condition information of the facial image acquired by the acquisition means is better than the condition information of the facial image of the collation object stored by the collation object storage means according to the condition information comparison means is a communication section.

In other words, the condition extraction section extracts condition information for extracting characteristic value of the facial image based on the facial image of the collation object acquired by the image acquisition section and the facial image of the collation object stored by the biological information DB. Then the acquired condition information on the facial image and the stored condition information on the facial image of the collation object are compared based on the condition information extracted by the comparison section, and when the acquired condition information on the facial image is better than the condition information on the facial image of the collation object stored by the collation object storage means, the acquired facial image is sent to the monitoring device.

As a result, only the facial images having condition information whereby characteristic value can be easily extracted are supplied to the biological information recognition device, which requires the collation processing between the acquired facial image and the facial image registered in the biological information DB, so only facial images suitable for collation processing are selectively supplied to the biological information recognition device, and unnecessary facial images are removed, which decreases processing load and improves collation accuracy.

According to the present invention, the processing load of a server related to a collation processing system, which is implemented by the server for performing collation processing between the facial images captured by a plurality of monitoring cameras and the facial images registered in the database, can be decreased, and collation accuracy can be improved.

DESCRIPTION OF THE PREFERRED EMBODIMENTS

Figure 1:
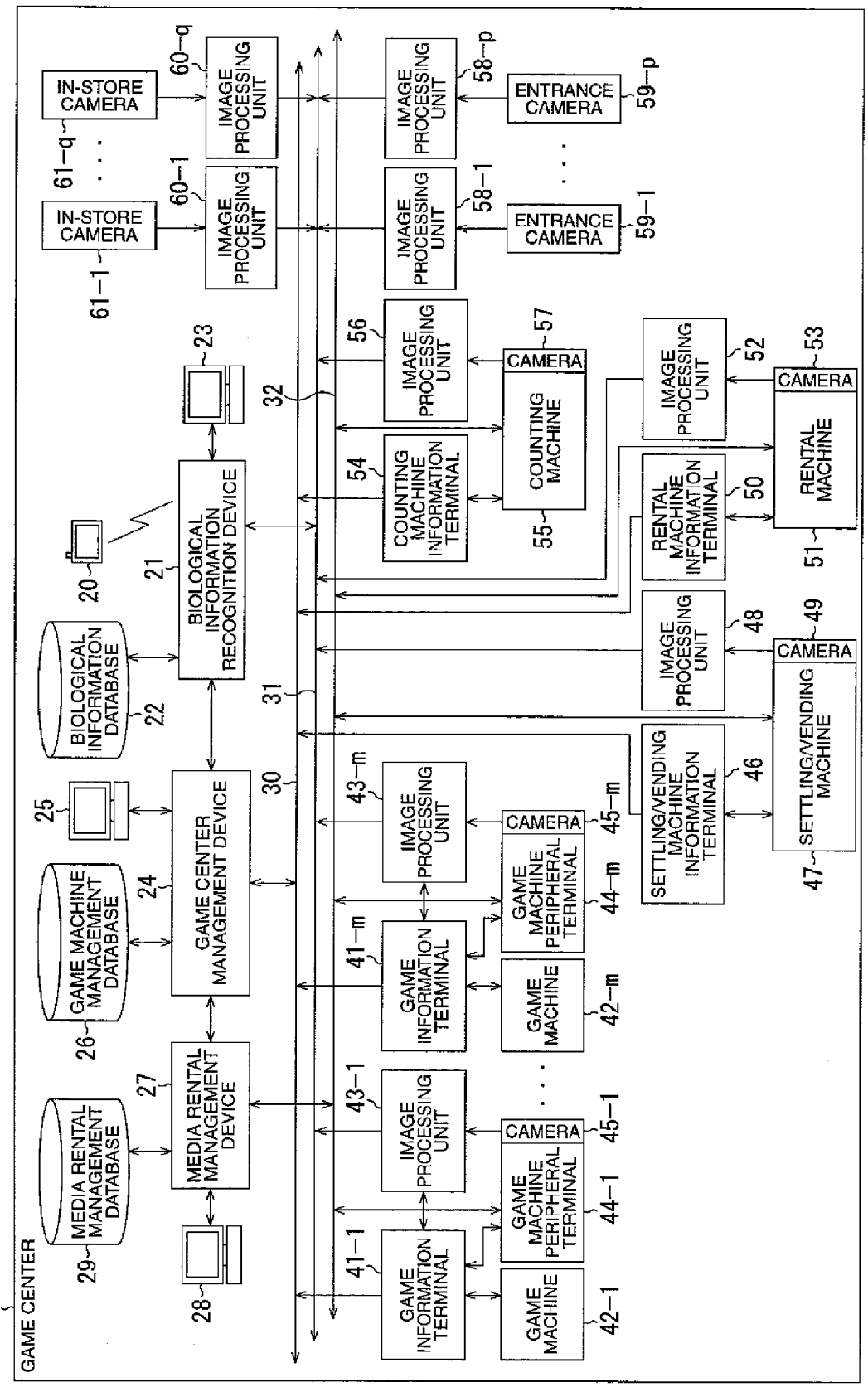
FIG. 1 is a diagram depicting a configuration of an embodiment of a monitoring system to which the present invention is applied.

Embodiments of the present invention will now be described, and an example of the correspondence of the Claims and embodiments written in "Description of the Preferred Embodiments" is as follows. This description is for confirming that embodiments that support the present invention are written according to the "Detailed Description of the Invention". Even if an embodiment is not written here as an embodiment corresponding to a Claim, it does not mean that this embodiment does not correspond to a Claim. Also, even if an embodiment is written here as one corresponding to a Claim, it does not mean that this embodiment does not correspond to a Claim other than that Claim.

A monitoring system according to one aspect of the present invention is a monitoring system comprising an information processing device for acquiring a facial image and a monitoring device for performing monitoring processing based on an image supplied from the information processing device, wherein the information processing device (e.g. image processing unit 43 in FIG. 9) further comprises: acquisition means (e.g. image acquisition section 201 in FIG. 9) for acquiring the facial image of an individual who approaches a game machine as a facial image of a collation object; collation object storage means (e.g. local biological information DB 207, 208 in FIG. 9) for storing a predetermined number of facial images of the collation object; condition information extraction means (e.g. condition extraction section 205a in FIG. 9) for extracting condition information, which indicates conditions for extracting characteristic value of the facial image based on the facial image of the collation object acquired by the acquisition means and the facial image of the collation object stored by the collation object storage means; condition information comparison means (e.g. comparison section 205b in FIG. 9) for comparing the condition information on the facial image acquired by the acquisition means and the condition information on the facial image of the collation object stored by the collation object storage means, based on the condition information extraction means; and transmission means (e.g. communication section 204 in FIG. 9) for sending the facial image acquired by the acquisition means to the monitoring device when the condition information on the facial image acquired by the acquisition means is better than the condition information on the facial image of the collation object stored by the collation object storage means, according to the condition information comparison means, and the monitoring device (e.g. biological information recognition device 21 in FIG. 11) further comprises: reception means (e.g. facial image acquisition section 221 in FIG. 11) for receiving the facial image of the collation object which is sent by the transmission means; storage means (e.g. biological information DB 22 in FIG. 11) for storing the facial image of the registered individual in a registered individual database; first similarity collation means (e.g. similarity calculation section 232 in FIG. 11) for calculating the similarity of the facial image of the collation object received by the reception means and the facial image of the registered individual stored by the storage means, and performing collation; first similarity judgment means (e.g. similarity judgment section 232 in FIG. 11) for judging whether the facial image of the collation object is the facial image of the registered individual by comparing the similarity which is the collation result of the first similarity collation means and a predetermined threshold; and notification means (communication section 224 in FIG. 11) for notifying that the collation object is the registered individual when the facial image of the collation object is the facial image of the registered individual based on the judgment result of the first similarity judgment means.

The information processing device may further comprise image capturing means (e.g. camera 45 in FIG. 9) for capturing images, and facial image extraction means (e.g. facial image extraction section in FIG. 9) for extracting a facial image of the collation object from the images captured by the capturing means, and the monitoring device may further comprise characteristic value extraction means (e.g. characteristic value extraction section 231 in FIG. 11) for extracting characteristic value from the facial image of the collation object, the reception means may receive the facial image of the collation object extracted by the facial image extraction means, and the first similarity collation means may calculate similarity using the facial mage of the collation object received by the reception means and characteristic value of the facial image of a registered individual stored by the storage means, and collate a facial image of the collation object received by the reception means and the facial image of the registered individual stored in the storage means.

The monitoring system may further comprise update means (e.g. database management section 206 in FIG. 9), wherein when the condition information on the facial image acquired by the acquisition means is better than the condition information on the facial image of the collation object stored by the collation object storage means according to the condition information comparison means (e.g. comparison section 205b in FIG. 9), the collation object storage section is updated by deleting a facial image of which the condition information is lowest from the predetermined number of facial images stored in the collation object storage means, and storing the facial image acquired by the acquisition means as a facial image of the collation object.

The information processing device may further comprise a second similarity collation means (e.g. similarity calculation section 212 in FIG. 9) for calculating similarity of the facial image of the collation object acquired by the acquisition means and the facial image of the collation object stored by the collation object storage means, and performing collation, and second similarity judgment means (similarity judgment section 213 in FIG. 9) for judging whether the facial image of the collation object acquired by the acquisition means is the facial image of the collation object stored in the collation object storage means based on the comparison of the similarity which is the collation result by the second similarity collation means and a predetermined threshold, the condition information comparison means compares the condition information on the facial image acquired by the acquisition means and the condition information on the facial image of the collation object stored by the collation object stored means, based on the condition information extracted by the condition information extraction means when the facial image of the collation object acquired by the acquisition means is the facial image of the collation object stored in the collation object storage means according to the judgment result of the second similarity judgment means, and the transmission means sends the facial image acquired by the acquisition means to the monitoring device when the condition information on the facial image acquired by the acquisition means is better than the condition information on the facial image of the collation object stored in the collation object storage means according to the condition information comparison means.

A monitoring method for a monitoring system according to an aspect of the present invention is a monitoring method for a monitoring system comprising an information processing device for acquiring a facial image and a monitoring device for performing monitoring processing based on an image supplied from the information processing device, wherein a monitoring method of the information processing device comprises: an acquisition step (e.g. step S113 in FIG. 16) of acquiring the facial image of an individual who approaches a game machine as a facial image of a collation object; a collation object storage step (e.g. step S123 in FIG. 16) of storing a predetermined number of facial images of the collation object; a condition information extraction step (e.g. step S114 in FIG. 16) of extracting condition information which indicates conditions for extracting characteristic value of the facial image based on the facial image of the collation object acquired by the acquisition step and the facial image of the collation object stored by the processing of the collation object storage step; a condition information comparison step (e.g. step S119 in FIG. 16) of comparing the condition information on the facial image acquired by the processing of the acquisition step and the condition information on the facial image of the collation object stored by the processing of the collation object storage step based on the condition information extracted by the processing of the condition information extraction step; and a transmission step (e.g. step S121 in FIG. 16) of sending the facial image acquired by the processing of the acquisition step to the monitoring device when the condition information on the facial image acquired by the processing of the acquisition step is better than the condition information on the facial image of the collation object stored by the processing of the collation object storage step according to the processing of the condition information comparison step, and the monitoring method of the monitoring device comprises: a reception step (e.g. step S141 in FIG. 16) of receiving the facial image of the collation object which is sent by the processing of the transmission step; a storage step of storing the facial image of the registered individual in a registered individual database; a first similarity collation step (e.g. step S53 in FIG. 14) of calculating the similarity of the facial image of the collation object received by the processing of the reception step and the facial image of the registered individual stored by the processing of the storage step, and performing collation; a first similarity judgment step (e.g. step S146 in FIG. 16) of judging whether the facial image of the collation object is the facial image of the registered individual by comparing the similarity which is the collation result of the processing of the first similarity collation step and a predetermined threshold; and a notification step (e.g. step S149 in FIG. 16) for notifying that the collation object is the registered individual when the facial image of the collation object is the facial image of the registered individual based on the judgment result in the processing of the first similarity judgment step.

FIG. 1 is a diagram depicting a configuration of an embodiment of a monitoring system of a game center according to the present invention.

A game center 1 is a pachinko hall, slot machine center or casino.

A biological information recognition device 21 collates information on facial images, which are extracted from images captured by cameras 45-1 to 45-$m$, 49, 53, 57, entrance cameras 59-1 to 59-$p$, and in-store cameras 61-1 to 61-$q$, using image processing units 43-1 to 43-$m$, 48, 52, 56, 58-1 to 58-$p$ and 60-1 to 60-$q$ respectively, and are sent via a biological information bus 31, with facial images pre-registered in a biological information database 22, and notifies the arrival of a registered player to a portable terminal 20 or display it on a display section 23, such as a CRT (Cathode Ray Tube) or LCD (Liquid Crystal Display) if there is a match. The biological information recognition device 21 also collates the facial images with the facial images pre-registered in the biological information database 22, and registers them in the biological information DB 22 if there is no match.

A game center management device 24 is the so called "hall computer", and it monitors the operation of a game machine 42, settling/vending machine 47, rental machine 51 and counting machine 55 using game information terminals 41-1 to 41-$m$ for managing the operation status of the game machines 42-1 to 42-$m$ respectively via a game center management information bus 30, a settling/vending machine information terminal 46 for managing the operation status of the settling/vending machine 47, a rental machine information terminal 50 for managing the operation status of the rental machine 51, and a counting machine information terminal 54 for managing the operation status of the counting machine 55. The game center management device 24 executes a predetermined processing according to the monitoring state on payout out of balls/medals from the game machine information terminal 41 of the game machine 42, call up information on a player of each game machine 42-1 to 42-$m$ and monitoring state on error generation, and displays the execution result on a display section 25, such as a CRT and LCD. The game center management device 24 manages a game machine management database 26 by the corresponding information supplied from the counting machine 55, game machines 42-1 to 42-$m$, and game machine peripheral terminals 44-1 to 44-*m* respectively, to the identification information (e.g. game machine number) for identifying each unit.

A media rental management device 27 manages the media rental management information of a rental game media using a media rental management database 29 based on the information supplied from a game machine peripheral terminal 44, settling vending machine 47 and rental machine 51, via a media rental management information bus 32.

The rental machine 51 receives a predetermined price by cash or prepaid card when the player plays game machine 42, and rents out a number of game media according to the price. At this time, the rental machine 51 supplies such information on received cash and the remaining amount on a prepaid card, as well as information on the number of rented game media, to the media rental management device 27. By this, the media rental management device 27 registers the information on received cash and remaining amount on a prepaid card, as well as information on the number of rented game media, in the media rental management database 29.

The settling/vending machine 47 sells prepaid cards with assigned points for renting game balls. At this time, the settling/vending machine 47 supplies the points of the prepaid card and received amount to the media rental management device 27. The settling/vending machine 47 settles the cash and pays out based on the remaining number of game media rented out as points of the prepaid card. At this time, the settling/vending machine 47 supplies the remaining amount of the prepaid card and returned cash to the media rental management device 27.

The counting machine 55 counts the number of media which the player acquired by playing a game at game machine 42, and outputs the counting result on a magnetic card or receipt.

The game machines 42-1 to 42-*m* execute the game according to a predetermined operation by the player, and pay out game balls or medals depending on the degree of winning.

The game machine peripheral terminals 44-1 to 44-*m* are inter-machine units installed corresponding on each game machine 42-1 to 42-*m*, and have an inter-machine rental ball unit (theoretically the same as rental machine 51). The game machine peripheral terminal 44 acquires the biological information, such as the facial image of a player who plays the game machine 42, and sends it to the biological information recognition device 21, along with the game machine identification information (game machine number). FIG. 1 shows an example when cameras 45-1 to 45-*m*, for acquiring a facial image of a player, are installed as a function to acquire the biological information.

Figure 2:
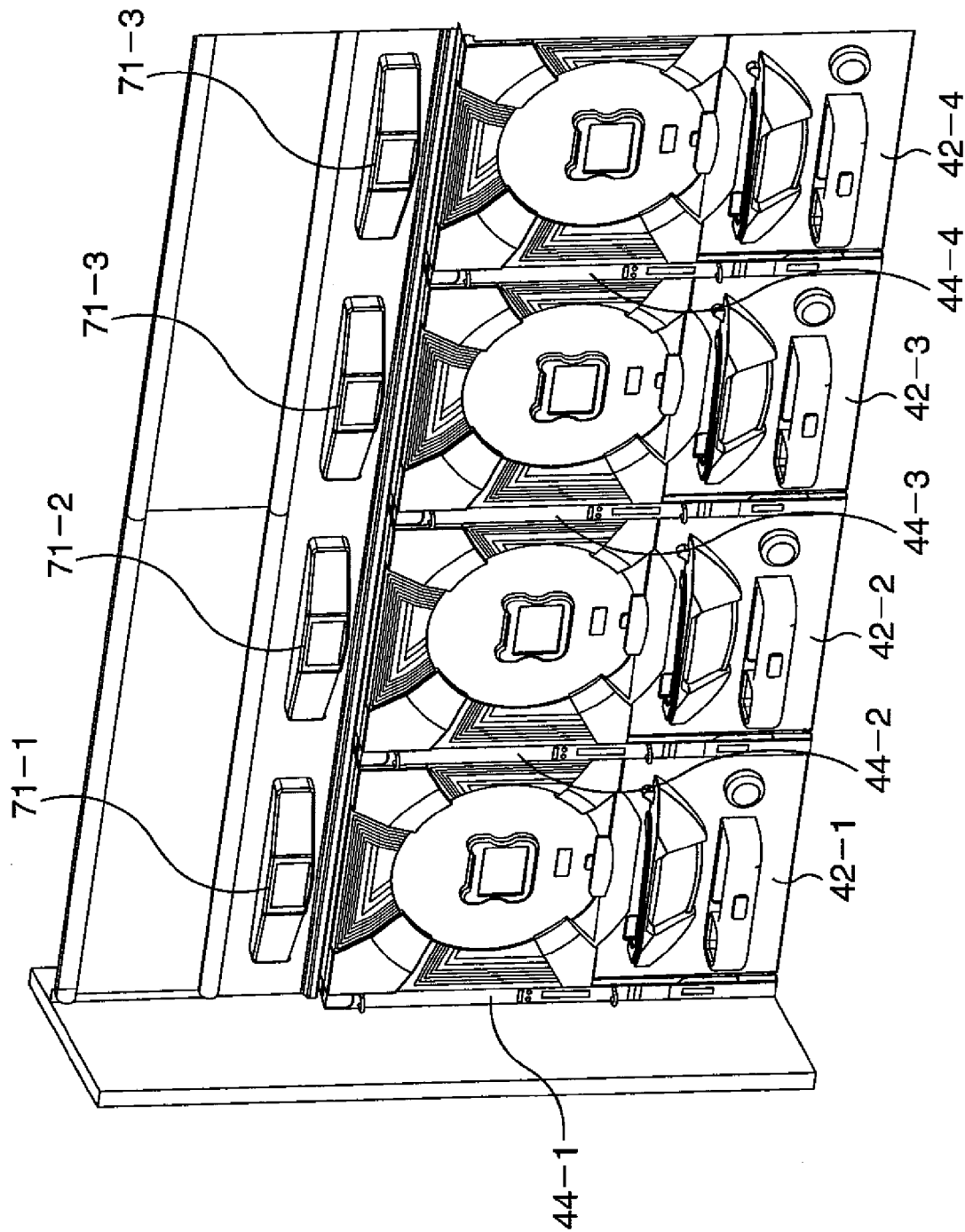
FIG. 2 is a diagram depicting an installation example of the cameras in FIG. 1.
Figure 3:
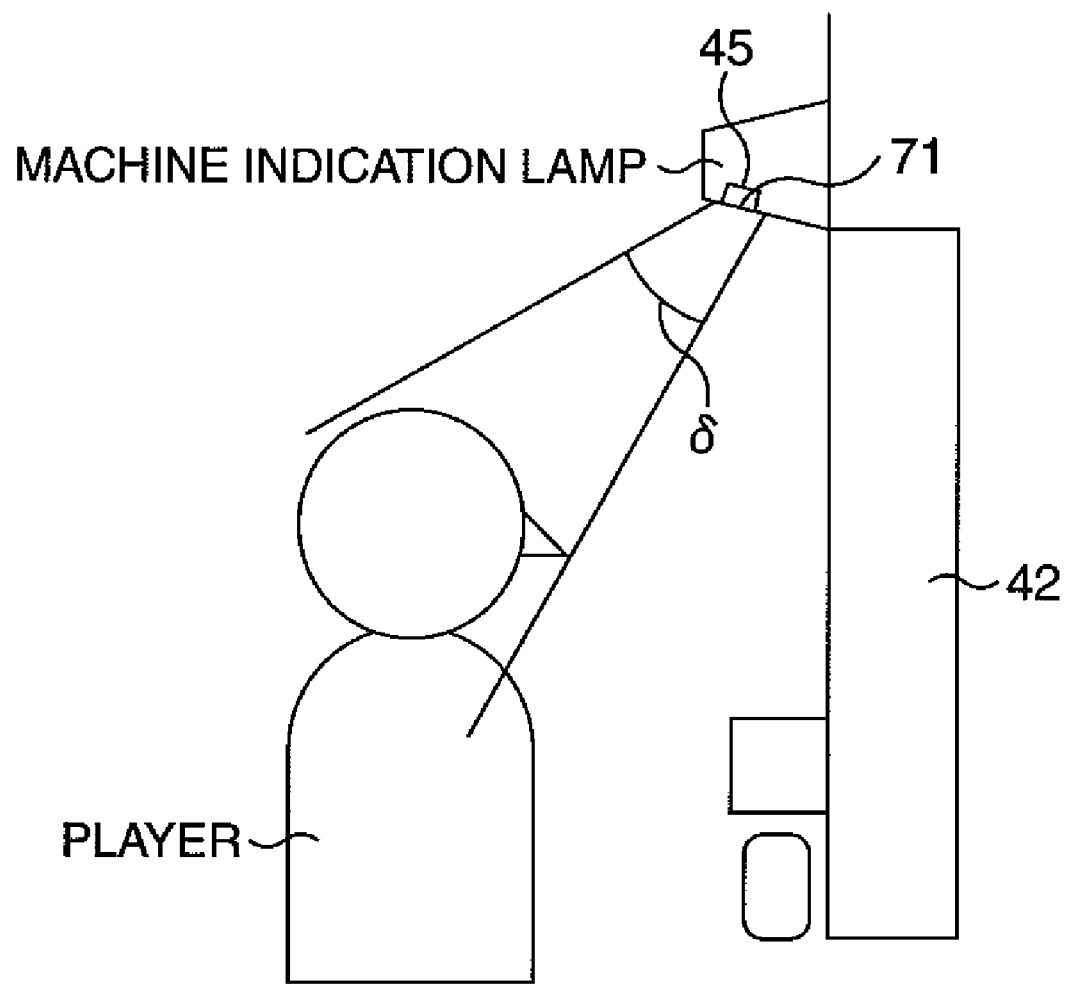
FIG. 3 is a diagram depicting an installation example of the cameras in FIG. 1.

The cameras 45-1 to 45-*m* may be installed, for example, such that an image of a player can be captured within a reading range δ, as shown in FIG. 3, below the machine indication lamps 71-1 to 71-4, which are installed above each game machine 42-1 to 42-4 respectively, as shown in FIG. 2, then each camera ID can be used for the game machine ID as well.

Figure 4:
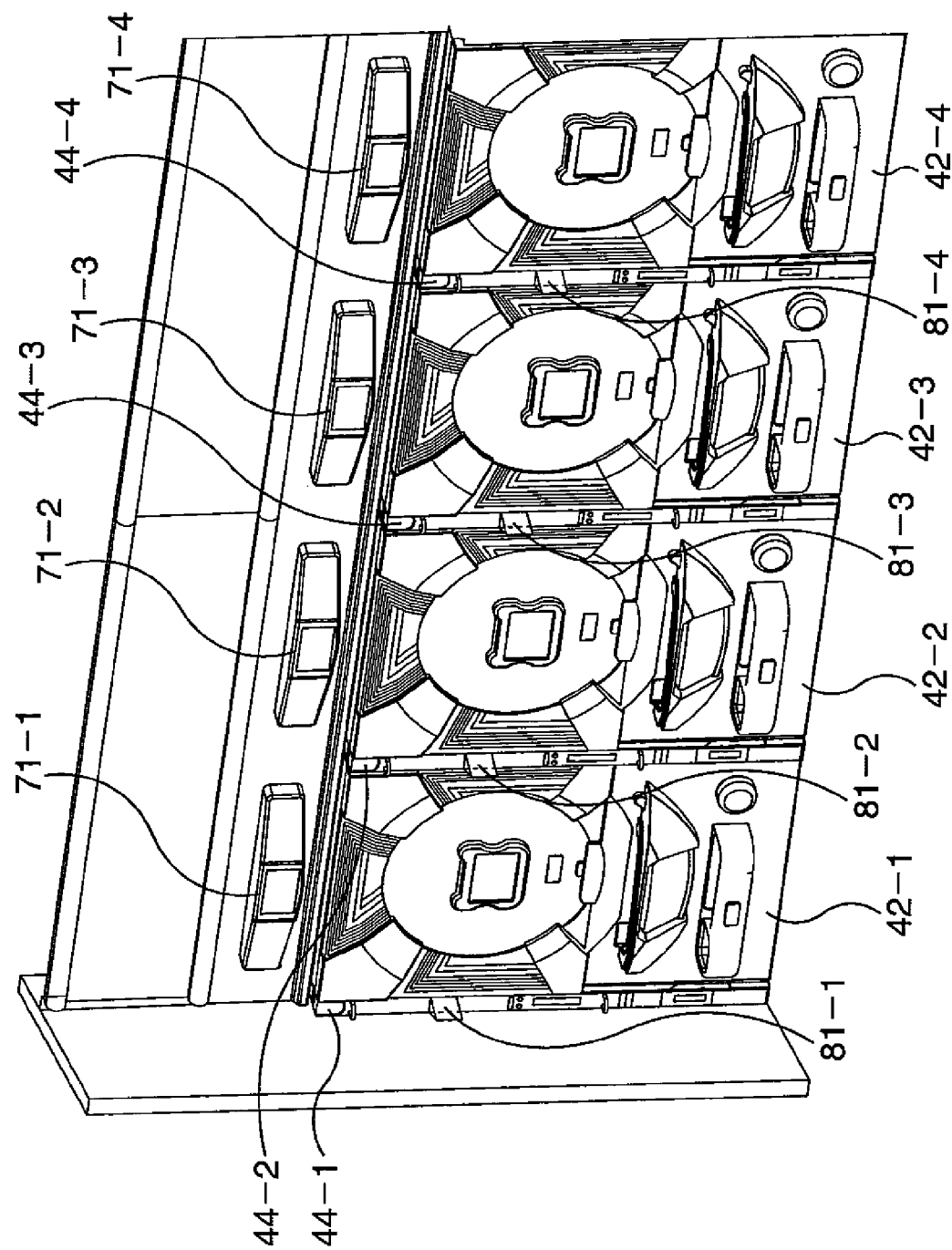
FIG. 4 is a diagram depicting an installation example of the cameras in FIG. 1.
Figure 5:
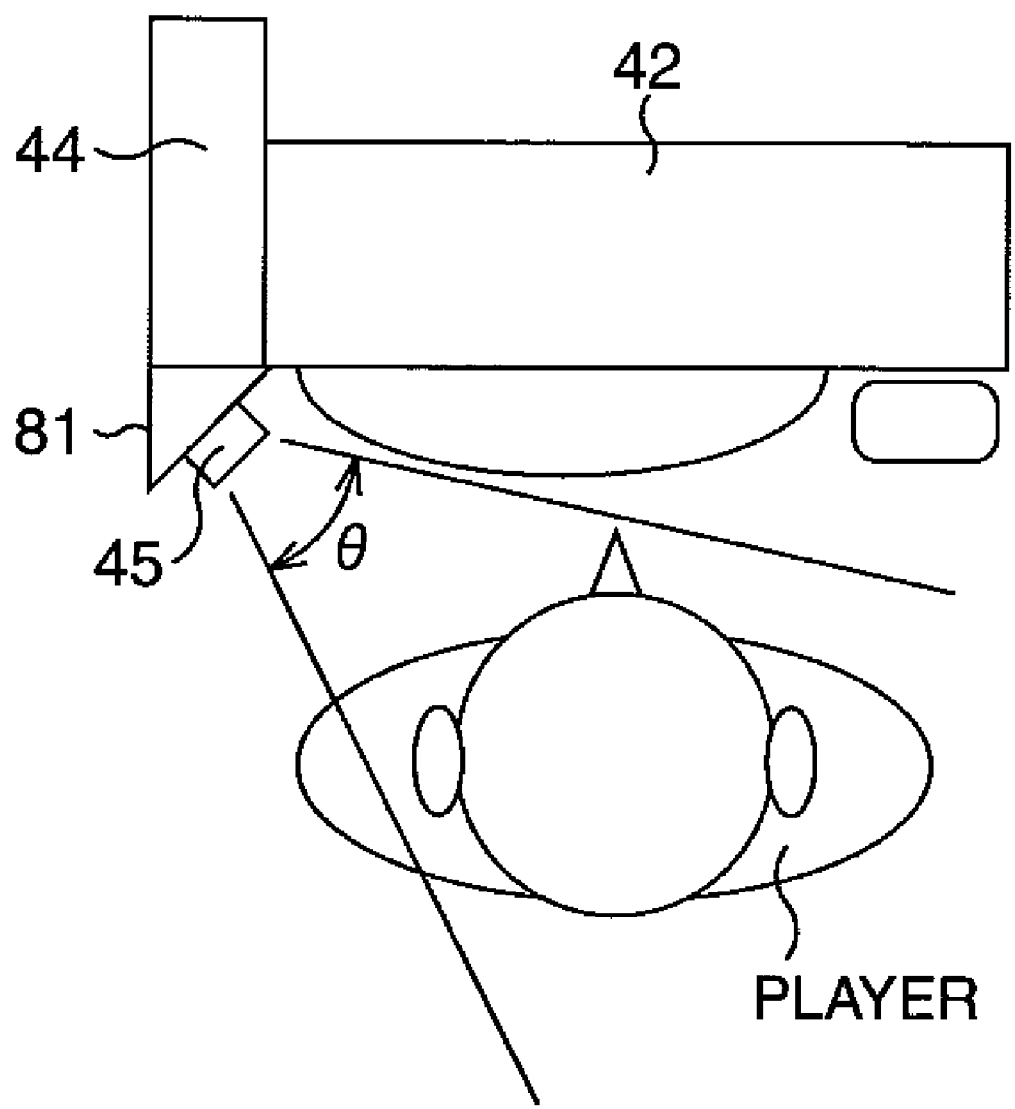
FIG. 5 is a diagram depicting an installation example of the cameras in FIG. 1.

The cameras 45-1 to 45-*m* may also be installed with forming protrusions 81-1 to 81-4 in the game machine peripheral terminals 44-1 to 44-4, as shown in FIG. 4, so that a facial image of a player can be captured in the reading range θ shown in FIG. 5.

Figure 6:
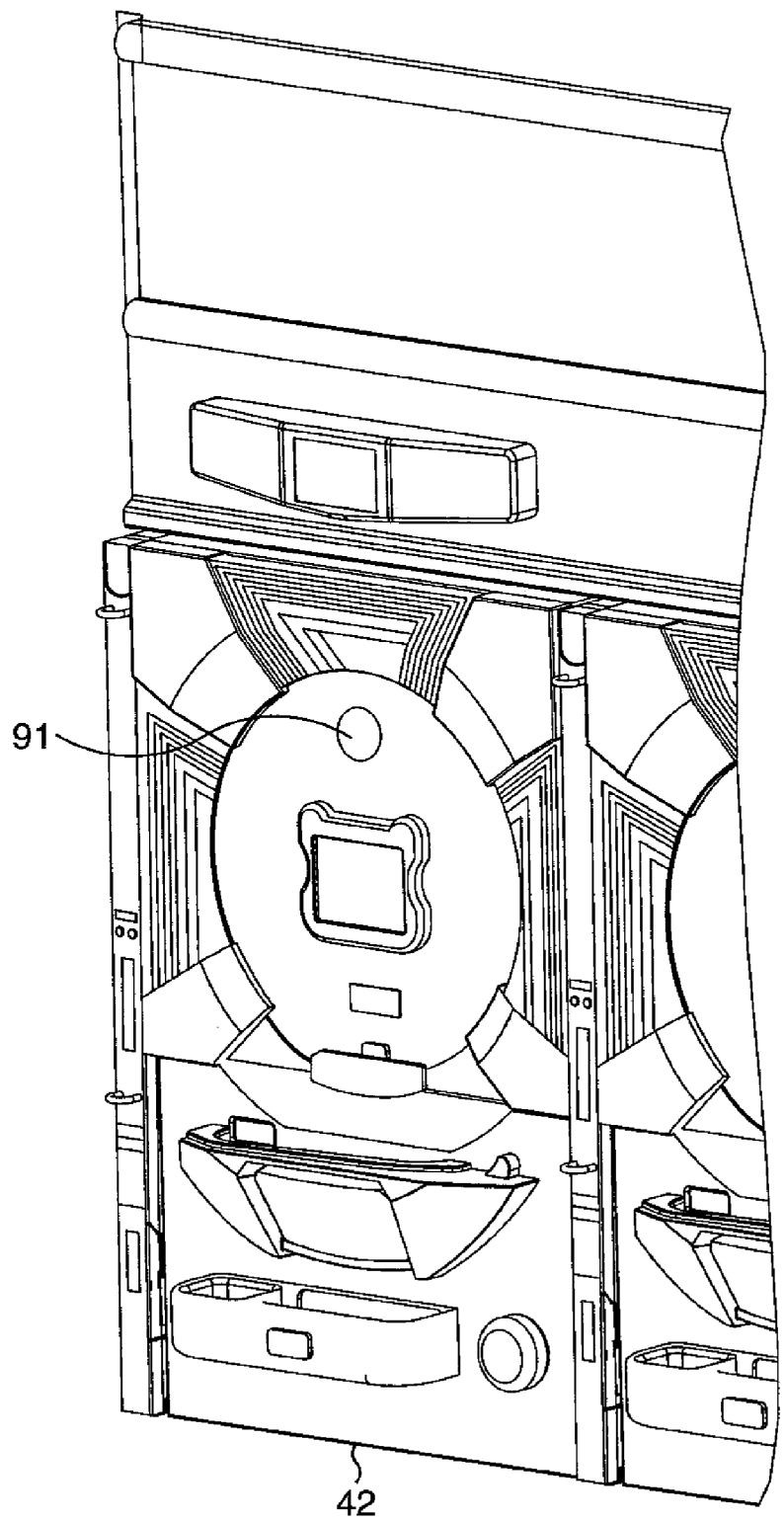
FIG. 6 is a diagram depicting an installation example of the cameras in FIG. 1.
Figure 7:
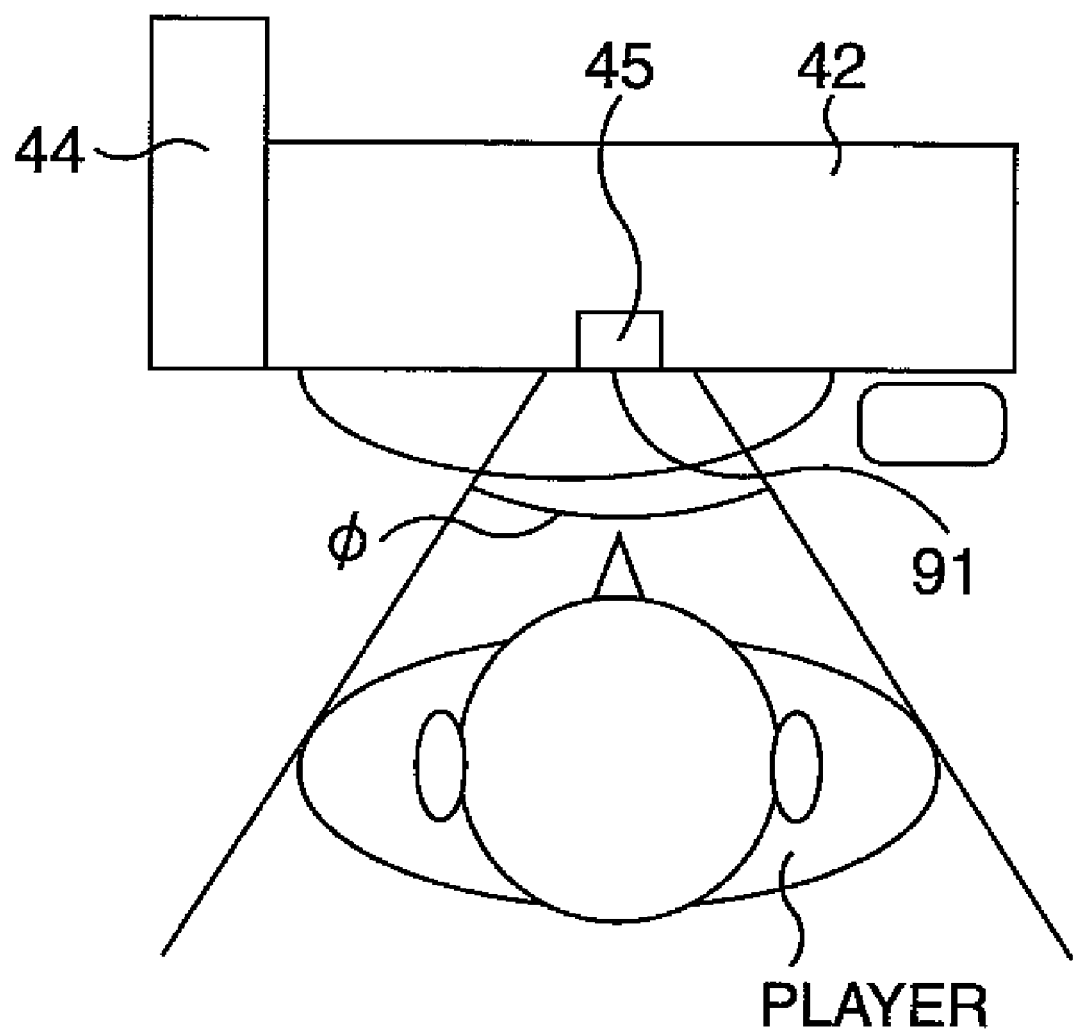
FIG. 7 is a diagram depicting an installation example of the cameras in FIG. 1.

The cameras 45-1 to 45-*m* may be installed in the middle of the game machine 42 (on the panel of the game machine 42) to capture an image, as shown in FIG. 6. In other words, by installing the camera 45 in the installation section 91 shown in FIG. 6, an image of the player is captured in the reading range φ shown in FIG. 7.

The entrance cameras 59-1 to 59-*p* and the in-store cameras 61-1 to 61-*q* are installed at entrances/exits and at predetermined locations in the game center 1, and supply the captured images to the image processing units 58-1 to 58-*p* and 60-1 to 60-*q* respectively.

Figure 8:
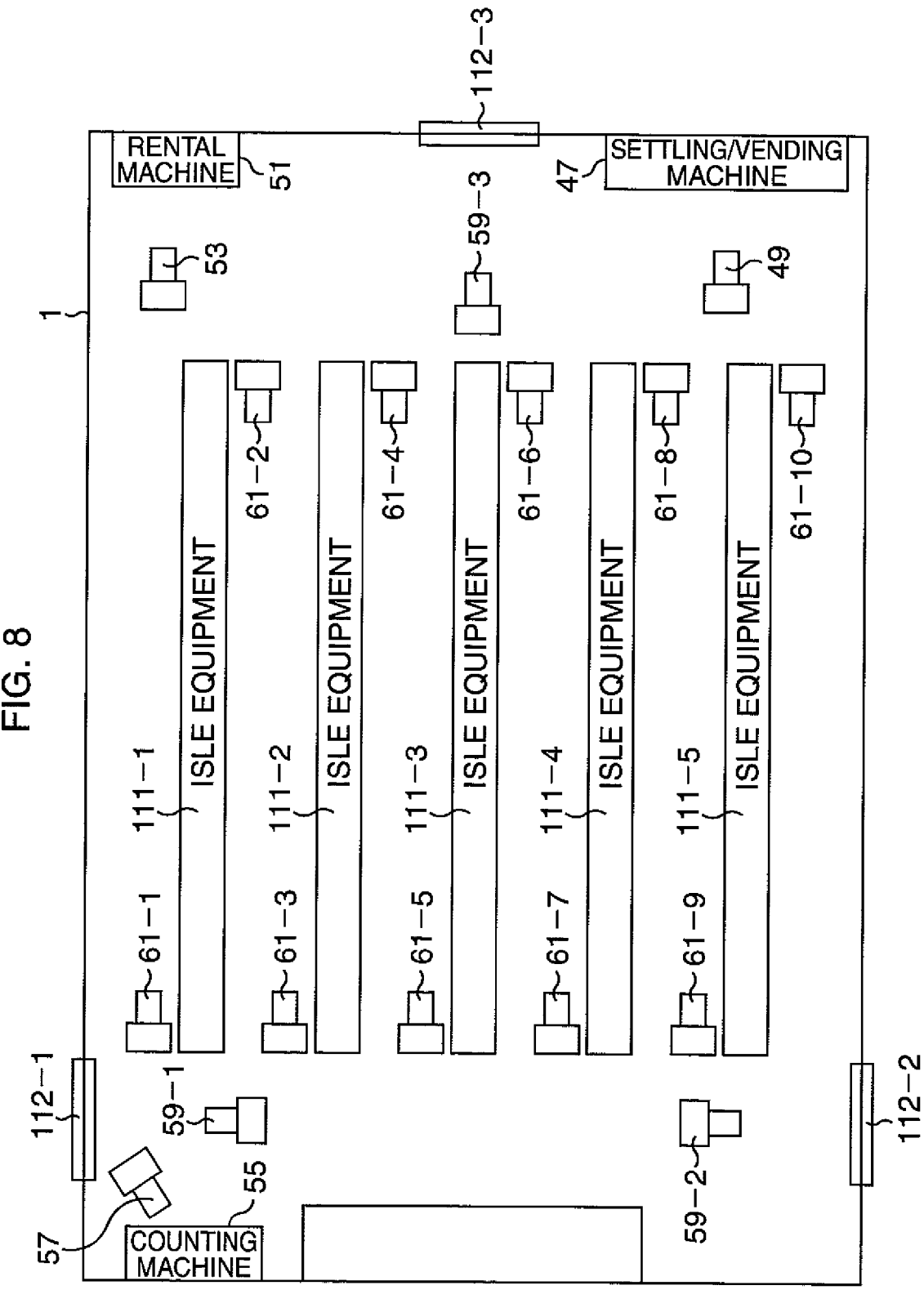
FIG. 8 is a diagram depicting an installation example of an entrance camera and an in-store camera in FIG. 1.

The entrance cameras 59-1 to 59-*p* and the in-store cameras 61-1 to 61-*q* are set as shown in FIG. 8, for example. FIG. 8 shows an installation example of the entrance cameras 59-1 to 59-*p* and in-store cameras 61-1 to 61-*q* in the game center 1.

In other words, in FIG. 8, there are entrances/exits 112-1 to 112-3, where the entrance cameras 59-1 to 59-3 capture the images of players who pass through the entrances/exits 112 respectively. The in-store cameras 61-1 to 61-10 are set at locations where both surfaces of island facilities 111-1 to 111-5 are in a row respectively. On both surfaces of the island facilities 111, game machines 42 are installed so as to sandwich the island facilities 111 in a vertical direction. Camera 45, entrance camera 59 and in-store camera 61 all have the pan tilt zoom function, therefore as FIG. 8 shows, the installation of the in-store cameras 61-1 to 61-10 allows images of all players who play a game at game machines 42 to be captured by one of the in-store cameras 61-1 to 61-10.

The camera 53 is installed in front of the rental machine 51, the camera 49 is installed in front of the settling/vending machine 47, and the camera 56 is installed in front of the counting machine 55, so as to capture the images of the players who use the rental machine 51, settling/vending machine 47 and counting machine 55 respectively.

In other words, as FIG. 8 shows, the cameras 45, entrance cameras 59 and in-store cameras 61 are installed in the game center 1, so that almost all behavior taken by players in the game center 1, such as arriving, playing at game machine 42, and using rental machine 51, settling/vending machine 47 and counting machine 55 can be monitored.

Figure 9:
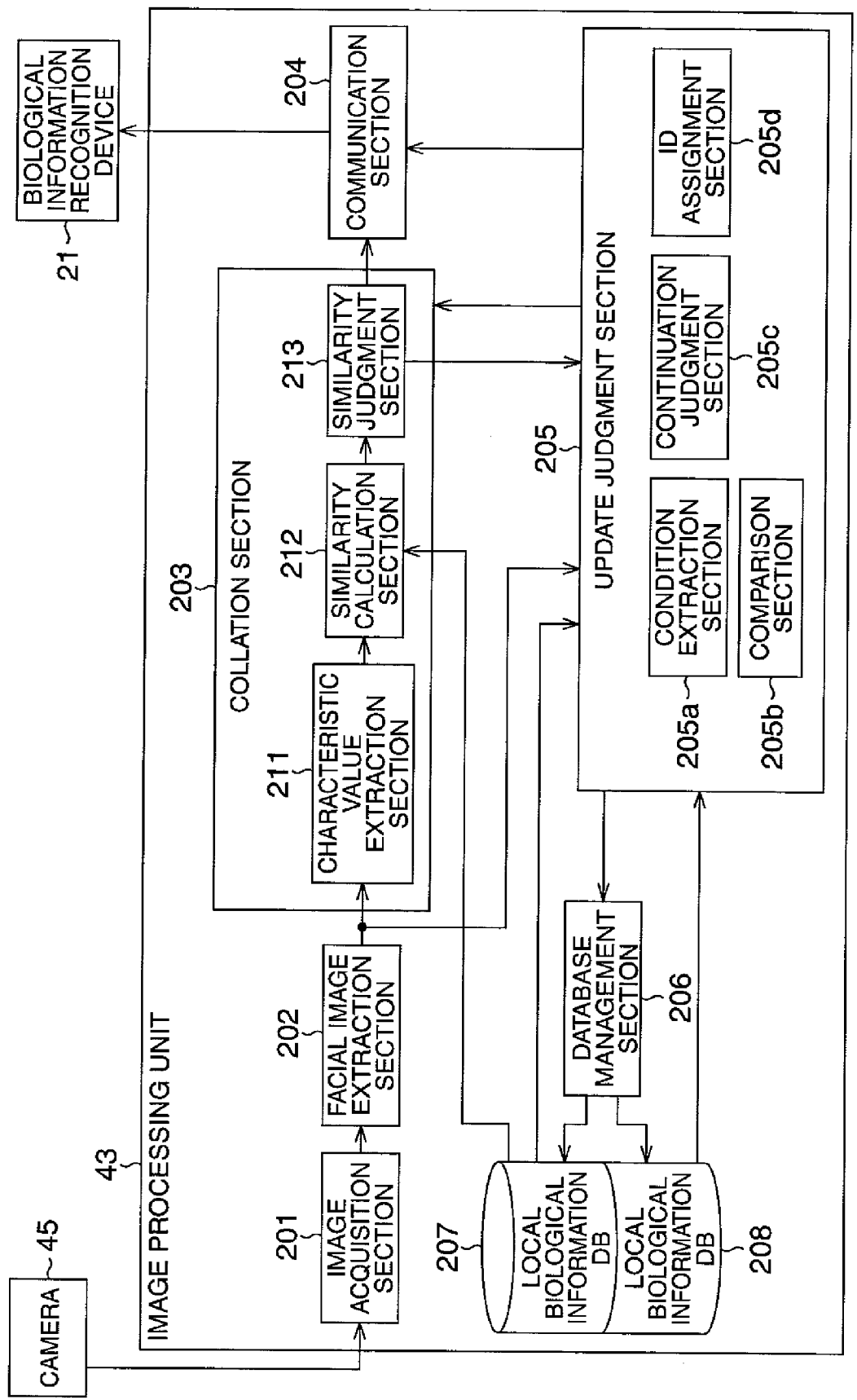
FIG. 9 is a diagram depicting a configuration example of an image processing unit in FIG. 1.

Now a configuration example of the image processing unit 43, which extracts a facial image from an image captured by the camera 45 of each game machine 42, and supplies it to the biological information recognition device 21, is described with reference to FIG. 9.

An image acquisition section 201 acquires an image captured by the camera 45, and supplies it to a facial image extraction section 202. The facial image extraction section 202 extracts a rectangular image of a facial image from the image supplied from the image acquisition section 201 based on a pattern, such as a section of a face, and supplies it to a collation section 203 and an update judgment section 205. The collation section 203 collates the facial image extracted by the facial image extraction section 202 with the previously captured facial images which are registered in a local biological information DB 207 and 208, or with a facial image captured that day, and supplies information on the presence of facial images having high similarity to the update judgment section 205.

More specifically, a characteristic value extraction section 211 of the collation section 203 extracts a characteristic value for identifying the facial image, and supplies it to a similarity calculation section 212 along with the facial image. The similarity calculation section 212 extracts a characteristic value of a previously captured facial image of a registered player registered in the local biological information DB 207, and determines similarity of the previously captured facial image of the registered player registered in the local biological information DB 207 using the characteristic value supplied from the characteristic value extraction section 211, and supplies the determined similarity to a similarity judgment section 213 along with the facial image supplied from the facial image extraction section 202. More specifically, the similarity calculation section 212 determines the difference sum, average ratio or ratio sum as a similarity based on various characteristic value of the face, such as the space between eyes, or a ratio of the length from chin to forehead and the length from the chin to nose.

The similarity judgment section 213 compares the similarity value supplied from the similarity calculation section 212 and a predetermined threshold, and when the facial image is similar to the facial image supplied from the facial image extraction section 202 (that is, when the similarity value is higher than the predetermined threshold in the case of using a similarity value which indicates higher similarity as the value is higher, or when the similarity value is lower than the predetermined threshold in the case of using the similarity value which indicates higher similarity as the value is lower), the similarity judgment section 213 supplies information that these facial images are similar, that is, these are facial images of a same individual, to the update judgment section 205, and also supplies the facial image to a communication section 204. The similarity judgment section 213 compares the similarity between the facial image supplied from the facial image extraction section 202 and the facial image previously captured, and the predetermined value, and when the previous image is not similar to the facial image supplied from the facial image extraction section 202 according to this comparison result, the similarity judgment section 213 supplies the facial image supplied from the facial image extraction section 202 to the communication section 204, and supplies the information to indicate that the facial images are not similar, that is, the facial images are from different individuals, to the update judgment section 205.

The update judgment section 205 is comprised of a condition extraction section 205*a*, comparison section 205*b*, continuation judgment section 205*c* and ID assignment section 205*d*. The condition extraction section 205*a* extracts condition information for extracting the characteristic value in a facial image from the facial image supplied from the facial image extraction section 202, and converts it into a score. In other words, the condition extraction section 205*a* converts the condition information to indicate an ease of extracting the characteristic value from a facial image based on the direction, size and brightness of facial images supplied from the facial image extraction section 202. The comparison section 205*b* compares the scores of the condition information of the top three facial images having the highest scores of the condition information, out of the previous captured facial images, and the score of the condition information of a facial image supplied from the facial image extraction section 202 when information to indicate that the facial image is similar to the previous facial image is supplied from the similarity judgment section 213 of the collation section 203, or when the continuation judgment section 205*c* judges that the facial image is continuous from the previously captured facial image. When the score of the condition information on the facial image supplied from the facial image extraction section 202 is higher, the comparison section 205*b* controls a database management section 206, so as to update the previously captured facial images stored in the local biological information DB 207 to the facial image supplied from the facial image extraction section 202, and instructs the communication section 204 to send the facial image supplied from the collation section 203 to the biological information recognition device 21. When the score of the condition information on the facial image supplied from the facial image extraction section 202 is lower, on the other hand, the comparison section 205*b* instructs the communication section 204 to not send the facial image supplied from the collation section 203 to the biological information recognition device 21.

When information that the facial image is not similar to the previous facial image is supplied from the similarity judgment section 213 of the collation section 203, that is, if the continuation judgment section 205*c* judged that the facial image is not continuous from the previously captured image, the comparison section 205*b* does not perform comparison processing. In this case, the update judgment section 205 controls the database management section 206 so as to additionally register the previous facial image stored in the local biological information DB 207 to the local biological information DB 208, and delete it from the local biological information DB 207, and register the facial image newly supplied from the facial image extraction section 202 to the local biological information DB 207. In this case, the ID assignment section 205*d* assigns a personal ID to the facial image newly supplied from the facial image extraction section 202, and supplies the personal ID to the communication section 204, and instructs the communication section 204 to send the facial image supplied from the collation section 203, along with the personal ID, to the biological information recognition device 21.

In the local biological information DB 207, the top three images having the highest condition information, out of the previously captured facial images with a same personal ID, are stored, and in the local biological information DB 208, the top three images having the highest condition information, out of the facial images with a same personal ID registered in the local biological information DB 207 on this day, are sequentially stored. Once the personal ID is registered, the facial images of a same player are distributed with the same personal ID attached.

Therefore the image processing unit 43 sends only a new facial image, out of the facial images captured by the camera 45 installed corresponding to the game machine 42, or facial images having good conditions to extract characteristic value out of the continuously captured facial images, to the biological information recognition device 21.

Figure 10:
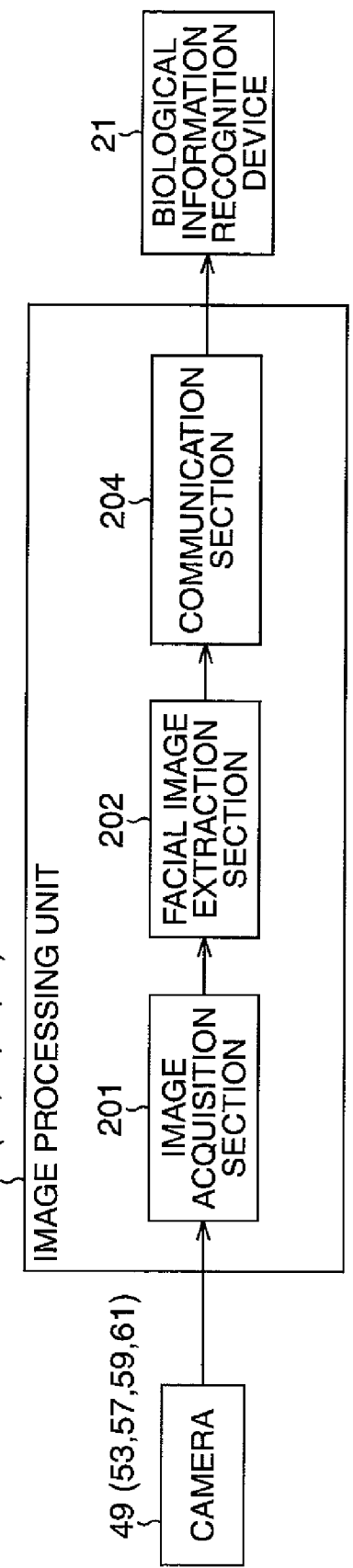
FIG. 10 is a diagram depicting a configuration of another image processing unit in FIG. 1.

Now a configuration example of the image processing unit 48, which extracts facial images from images captured by the camera 49 installed in the settling/vending machine 47 and supplies them to the biological information recognition device 21, will be described with reference to FIG. 10. Composing elements the same as those described with reference to FIG. 9 will be denoted with a same name or reference symbol. The image processing unit 48 is comprised of an image acquisition section 201, facial image extraction section 202 and communication section 204.

According to this configuration of the image processing unit 48, the facial image extraction section 202 extracts a rectangular image of a facial image from the image captured by the camera 49 acquired by the image acquisition section 201 based on a pattern, such as a section of a face, and the communication section 204 sends the facial image to the biological information recognition device 21.

In other words, unlike the image processing unit 43, the image processing unit 48 does not have a collation section 203, update judgment section 205, database management section 206, and local biological information DBs 207 and 208, so the extracted facial image is sent to the biological information recognition device 21 regardless whether the facial image has a good condition for extracting characteristic value or not. Since the image processing unit 48 cannot identify the facial image for each player, a personal ID is not assigned to the facial image to be supplied to the biological information recognition device 21.

The configurations of image processing units 52, 56, 58-1 to 58-$p$ and 60-1 to 60-$q$, which extracts facial images from images captured by the cameras 49, 53 and 57 installed in the rental machine 51, and counting machine 55, the entrance cameras 59-1 to 59-$p$ and the in-store cameras 61-1 to 61-$q$ and supplies them to the biological information recognition device 21, are the same as the configuration of the image processing unit 48, so description thereof is omitted.

Figure 11:
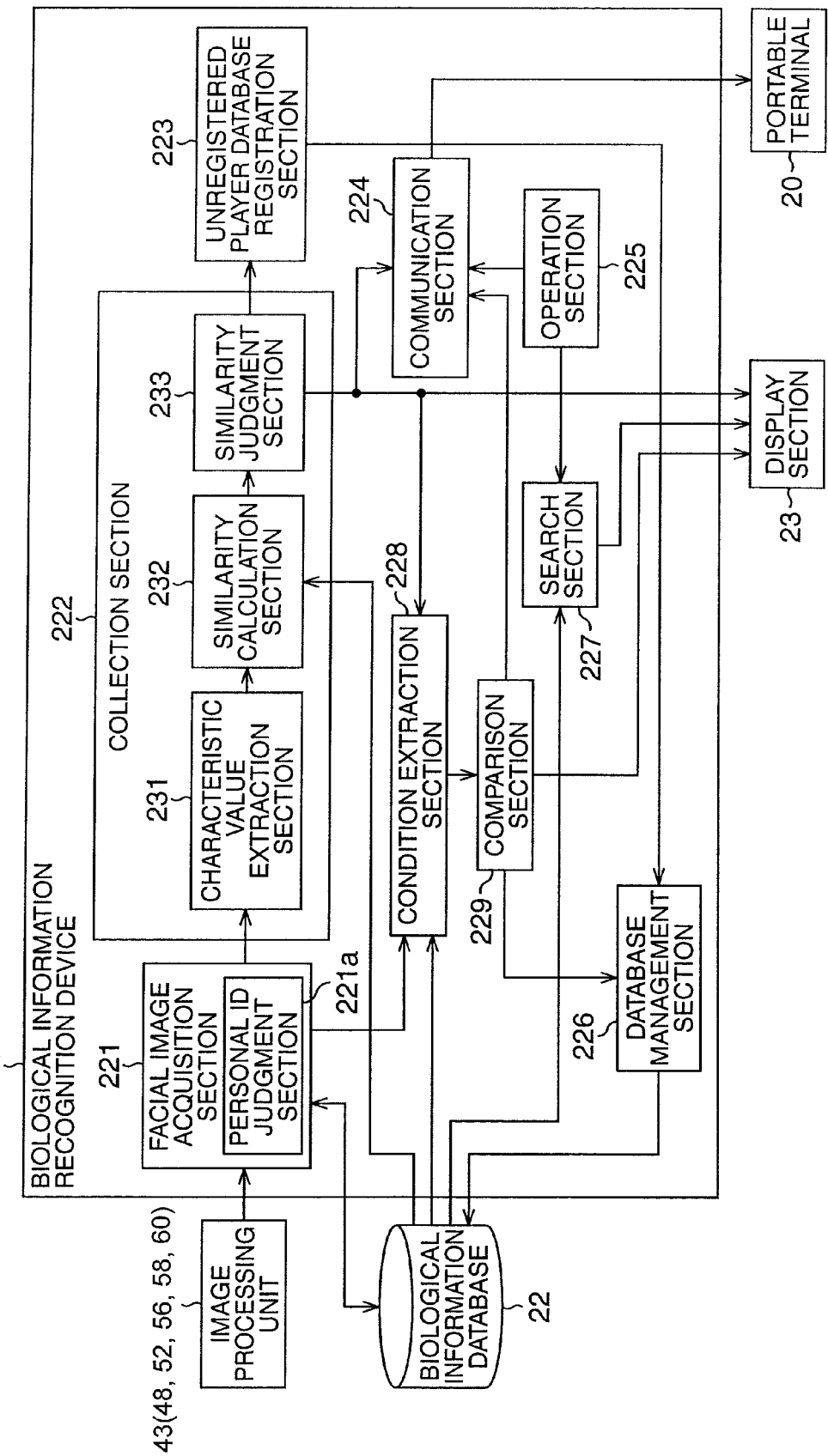
FIG. 11 is a diagram depicting a configuration example of a biological information recognition device in FIG. 1.

Now a configuration example of the biological information recognition device 21 will be described with reference to FIG. 11.

A facial image acquisition section 221 acquires facial images supplied from the image processing units 43, 48, 52, 56, 58 and 60, and supplies them to a collation section 222. The facial image acquisition section 221 has a personal ID judgment section 221*a*, and when a personal ID is assigned to a supplied facial image, the personal ID judgment section 221*a* searches for the personal ID registered in the biological information DB 22, and when the personal ID exists, the personal ID judgment section 221*a* supplies the facial image to a database management section 226 to update the biological information DB 22. The collation section 222 collates the facial image acquired by the facial image acquisition section 221 and facial images of a registered player registered in the biological information DB 22, and when a facial image to be a candidate of having high similarity exists, the collation section 222 displays up to three top candidates on a display section 23 as the collation result. When a facial image to be a candidate of having high similarity does not exist, the collation section 222 supplies the supplied facial image to an unregistered player database registration section 223.

More specifically, a characteristic value extraction section 231 of the collation section 222 extracts characteristic value for identifying the facial image, and supplies it to a similarity calculation section 232 along with the facial image. The similarity calculation section 232 extracts a characteristic value of a facial image of a registered player that is registered in the biological information DB 22, and determines similarity with the facial images of all the registered players registered in the biological information DB 22, using the characteristic value supplied from the characteristic value extraction section 231, and supplies the facial image supplied from the facial image acquisition section 221 and the top three facial images having the highest similarity to a similarity judgment section 233. More specifically, the similarity calculation section 232 determines the difference sum, average ratio or ratio sum as a similarity based on various characteristic value of the face, such as the space between eyes, or a ratio of the length from chin to forehead and the length from chin to nose.

The similarity judgment section 233 stores the similarity supplied from the similarity calculation section 232 for a facial image without a personal ID supplied from the image processing units 48, 52, 56, 58 or 60 installed in a location distant from the game machine 42, compares the highest similarity of a facial image out of the similarities of the top three facial images, and a predetermined threshold, and based on this comparison result, when the registered facial image having the highest similarity is similar to the facial image supplied from the facial image acquisition section 221 based on the comparison result (that is, when the similarity value is higher than the predetermined threshold in the case of using a similarity value which indicates high similarity as the value is higher, or when the similarity value is lower than the predetermined threshold in the case of using a similarity value which indicates higher similarity as the value is lower), the similarity judgment section 233 supplies the top three facial images and similarity information to the display section 23 to have them displayed, and supplies the same to the communication section 224. Then the similarity judgment section 233 also compares the similarity of the top facial image and the predetermined threshold, and when the top registered facial image is not similar to the facial image supplied from the facial image acquisition section 221 based on the comparison result, the similarity judgment section 233 supplies the facial image supplied from the facial image acquisition section 221 to the unregistered player database registration section 223.

The similarity judgment section 233 stores the similarity supplied from the similarity calculation section 232 for a facial image having a personal ID supplied from the image processing unit 43 installed corresponding to the game machine 42, compares the highest similarity of a facial image out of the similarities of the top three facial images, and a predetermined threshold, and based on this comparison result, when the registered facial image having the highest similarity is similar to the facial image supplied from the facial image acquisition section 221, the similarity judgment section 233 supplies the facial image supplied from the facial image acquisition section 221 and the facial image having the highest similarity to a condition extraction section 228. The condition extraction section 228 extracts condition information for extracting the characteristic value, and supplies it to a comparison section 229. The comparison section 229 compares a score value of the condition information on the facial image supplied from the facial image acquisition section 221 and a score value of the condition information on the facial image having the highest similarity, and when the score value of the condition information on the facial image supplied from the facial image acquisition section 221 is higher, the comparison section 229 supplies the facial image supplied from the facial image acquisition section 221 to the database management section 226, to have this facial image registered in the biological information DB 22, instead of the facial image having the highest similarity to update the biological information DB 22, and supplies the top three facial images, including the facial image supplied from the facial image acquisition section 221 and similarity information, to the display section 23 for display, instead of the facial image having the highest similarity, and also supplies this information to a communication section 224.

The similarity judgment section 233 compares the highest similarity of the facial image and the predetermined threshold, and based on the comparison result, when the registered facial image having the highest similarity is not similar to the facial image supplied from the facial image acquisition section 221, the similarity judgment section 233 supplies the facial image supplied from the facial image acquisition section 221 to the unregistered player database registration section 223 along with the personal ID.

The unregistered player database registration section 223 supplies the facial image, which was regarded as an unregistered image by the collation section 222 and was supplied, to the database management section 226, and is registered in the biological information DB 22.

An operation section 225 is comprised of a button, mouse or keyboard, and is operated when one of the top three facial images having the highest similarity displayed on the display section 23 is selected, and supplies the operation result to the communication section 224. The communication section 224 is comprised of a modem, and sends the selected facial image to a portable terminal 20 based on an operation signal from the operation section 225.

In this description, it is assumed that the similarity value is higher as the facial image is closer to a facial image registered as a registered player, which is indicated by a ratio sum, for example, and when the similarity is higher than a predetermined threshold, the facial image is judged as the same facial image of the registered player. However, in the case when the similarity is represented as a difference sum of the respective characteristic value between the captured facial image and the facial image registered as a registered player, the similarity judgment section 233 regards the captured facial image as the facial image of the registered player when the similarity value is lower than a threshold, and in the case of an average ratio, the simplicity judgment section 233 regards the captured facial image and the facial image of the registered player as the same person if the value is a predetermined value or more in a 0 to 1 range, and is close to 1.

When new information on a facial image is supplied from the unregistered player database registration section 223, the database management section 226 updates the biological information DB 22 based on the supplied facial image. The database management section 226 registers the facial images supplied by the comparison section 229, instead of the facial image having the same personal ID registered in the biological information DB 22, so as to update the biological information DB 22.

Figure 12:
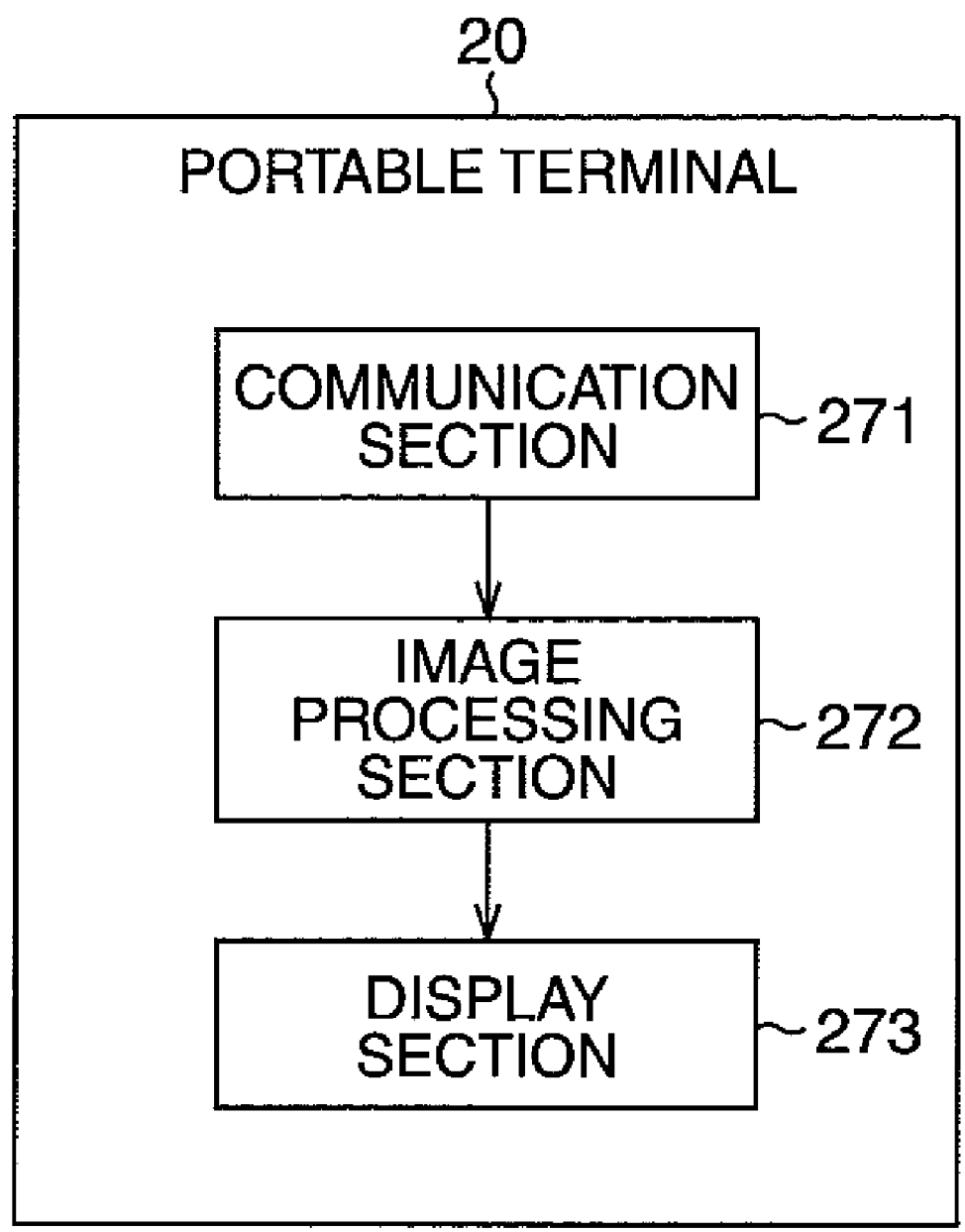
FIG. 12 is a diagram depicting a configuration example of a portable terminal in FIG. 1.

Now a configuration example of the portable terminal 20 will be described with reference to FIG. 12.

The communication section 271 is comprised of a modem, and exchanges data with the biological information recognition device 21 via a radio communication network in the game center 1. The communication section 271 also acquires information which indicates the arrival of a player of which facial image is similar to the facial image sent from the biological information recognition device 21 and supplied from the image processing unit 43, 48, 52, 56, 58, 60, and supplies it to the image processing section 272.

Based on the information which indicates the arrival of a player, of which facial image is similar to the facial image supplied FROM the image processing unit 43, 48, 52, 56, 58, 60 supplied from the communication section 271, the image processing section 272 generates an image to be displayed on the display section 273 comprised of an LCD, and has the display section 273 to display the image.

Now a registered player arrival monitoring processing, when a facial image is supplied from the image processing unit 60 (same for 48, 52, 56 and 58), when a facial image is extracted from the images captured by the entrance camera 59, and when a facial image without a personal ID is supplied to the biological information recognition device 21, will be described with reference to the flow chart in FIG. 13, as an example of the camera installed in a location distant from the game machine 42.

In step S1, the entrance camera 59 judges whether the door of the entrance/exit opened or not based on the information on the captured image or the signal from the door at the entrance/exit, and repeats this processing until a predetermined time elapses.

If it is judged that the door opened in step S1, the entrance camera 59 captures an image in an installation range, and supplies the captured image to the image processing unit 60 in step S2. The image acquisition section 201 of the image processing unit 60 acquires the supplied image and supplies it to the facial image extraction section 202.

In step S3, the facial image extraction section 202 extracts the facial image of the player from the supplied images and supplies it to the communication section 204. More specifically, the facial image extraction section 202 extracts the facial image based on the location of the characteristic areas, such as the eyes and nose, which are skin areas which can be identified by the color of the captured image, and supplies it to the communication section 204.

In step S4, the communication section 204 sends the facial image supplied from the facial image extraction section 202 to the biological information recognition device 21. At this time, the communication section 204 sends such information as the camera ID which identifies each camera 45, entrance camera 59 and in-store cameras 61, and the transmission time to the biological information recognition device 21, along with the facial image.

In step S21, the facial image acquisition section 221 of the biological information recognition device 21 acquires the facial images. In step S22, the facial image acquisition section 221 extracts one unprocessed facial image out of the supplied facial images, and supplies it to the characteristic value extraction section 231.

In step S23, the characteristic value extraction section 231 of the collation section 222 extracts the characteristic value from the supplied facial image, and supplies it to the similarity calculation section 232 along with the facial image.

In step S24, the similarity calculation section 232 executes the similarity calculation processing.

Figure 14:
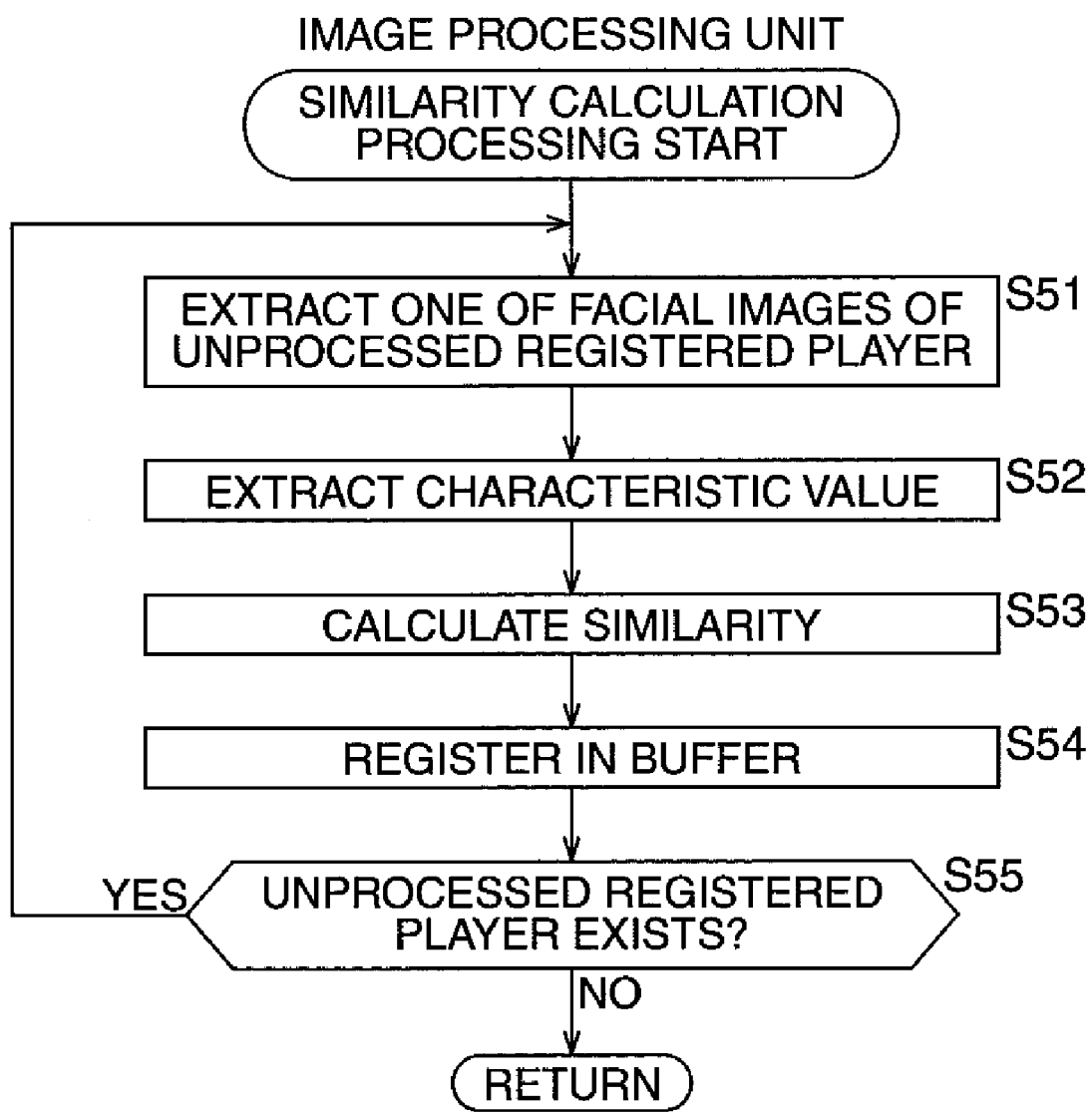
FIG. 14 is a flow chart depicting a similarity calculation processing.

Now the similarity calculation processing will be described with reference to the flow chart in FIG. 14.

In step S51, the similarity calculation section 232 extracts one unprocessed facial image of the registered player out of the facial images registered in the biological information DB 22, and sets it as a processing target.

In step S52, the similarity calculation section 232 extracts the characteristic value, similar to the characteristic value supplied from the characteristic value extraction section 231, from the facial images registered in the biological information DB 22, which is set as a processing target.

In step S53, the similarity calculation section 232 calculates the similarity, as a difference sum, average ratio or ratio sum, using various characteristic value of the face, such as the space between eyes, the ratio of the length from the chip to the forehead and the length from the chin to noise, on the facial image supplied by the characteristic value extraction section 231, and similar characteristic values on the facial image registered in the biological information DB 22, and supplies the calculation result, that is the similarity with the facial image registered in the biological information DB 22, to the similarity judgment section 233 in step S54.

In step S55, the similarity calculation section 232 judges whether the unprocessed facial image of a registered player exists in the biological information DB 22, and when an unprocessed facial image of the registered player exists, the processing returns to step S51. In other words, the processing from step S51 to S55 is repeated until similarity with all the facial images of the registered players in the biological information DB 22 are calculated. If it is judged that no unprocessed facial image of the registered players exists in the biological information DB 22 in step S55, the similarity calculation processing ends.

Figure 13:
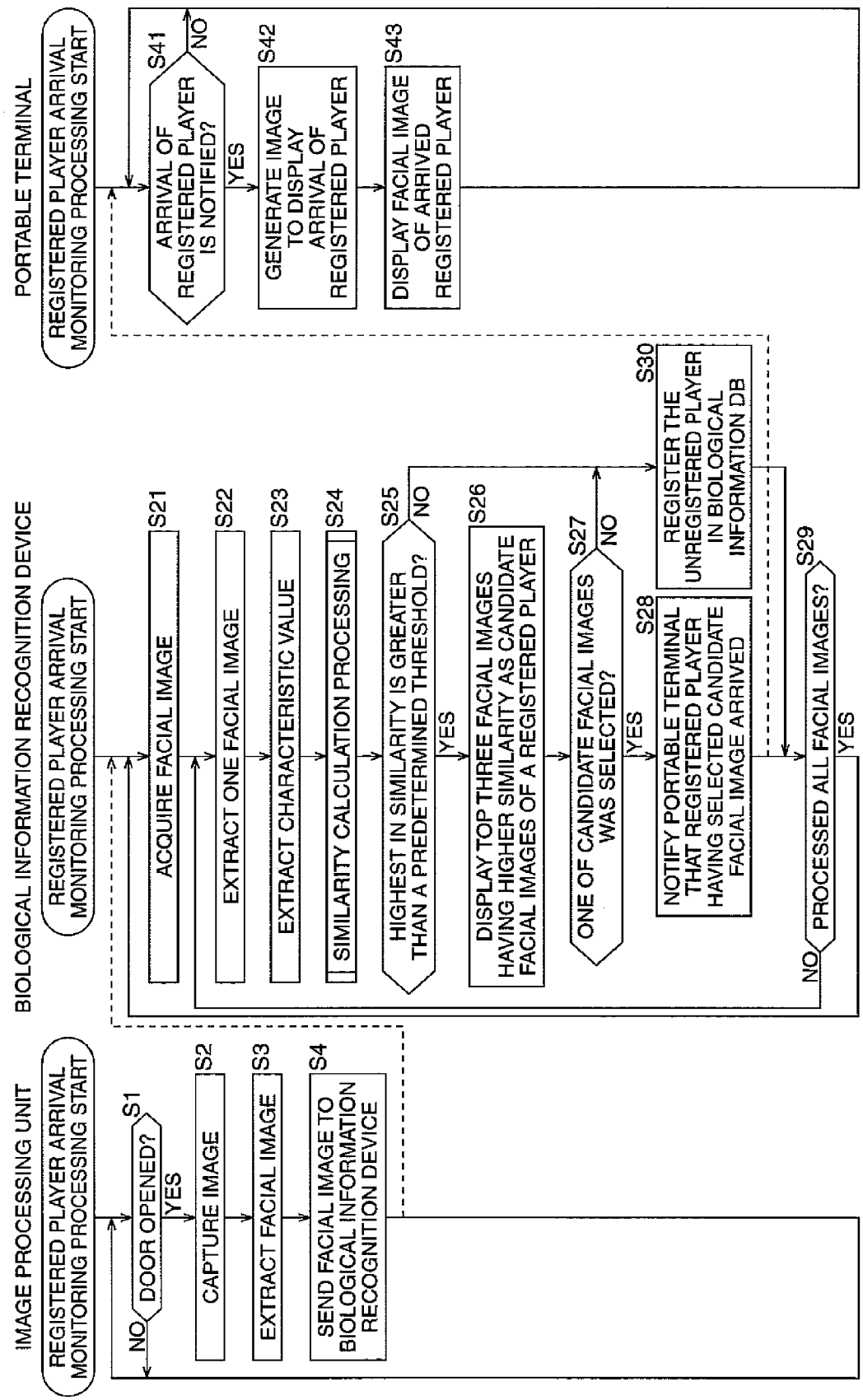
FIG. 13 is a flow chart depicting a registered player arrival monitoring processing.

Now description of the flow chart in FIG. 13 will be continued.

In step S25, the similarity judgment section 233 determines the rank of similarities based on the calculation result, and extracts information on the top three facial images having a highest similarity registered in the biological information DB 22. Based on the information on the top three facial images and their similarities, the similarity judgment section 233 judges whether the highest similarity is greater than a predetermined threshold. In other words, the similarity judgment section 233 compares the similarity of the most similar registered player (registered player who is most similar to the facial image acquired by the facial image acquisition section 221 out of the facial images registered in the biological information DB 22, in this case the registered player having the highest similarity) with a predetermined threshold value.

As mentioned above, the similarity of the captured facial image and the facial image of the registered player is not always higher as the value becomes higher, depending on the definition of the similarity, so the size relationship of the similarity value and the threshold may be different from the case of this example.

If the highest similarity is judged as greater than the predetermined threshold in step S25, in step S26, the similarity judgment section 233 controls the display section 23, and displays the notification screen 301 which indicates that the top three facial images supplied from the similarity calculation section 232 are candidates of the facial image of the registered player on the display section 23.

Figure 15:
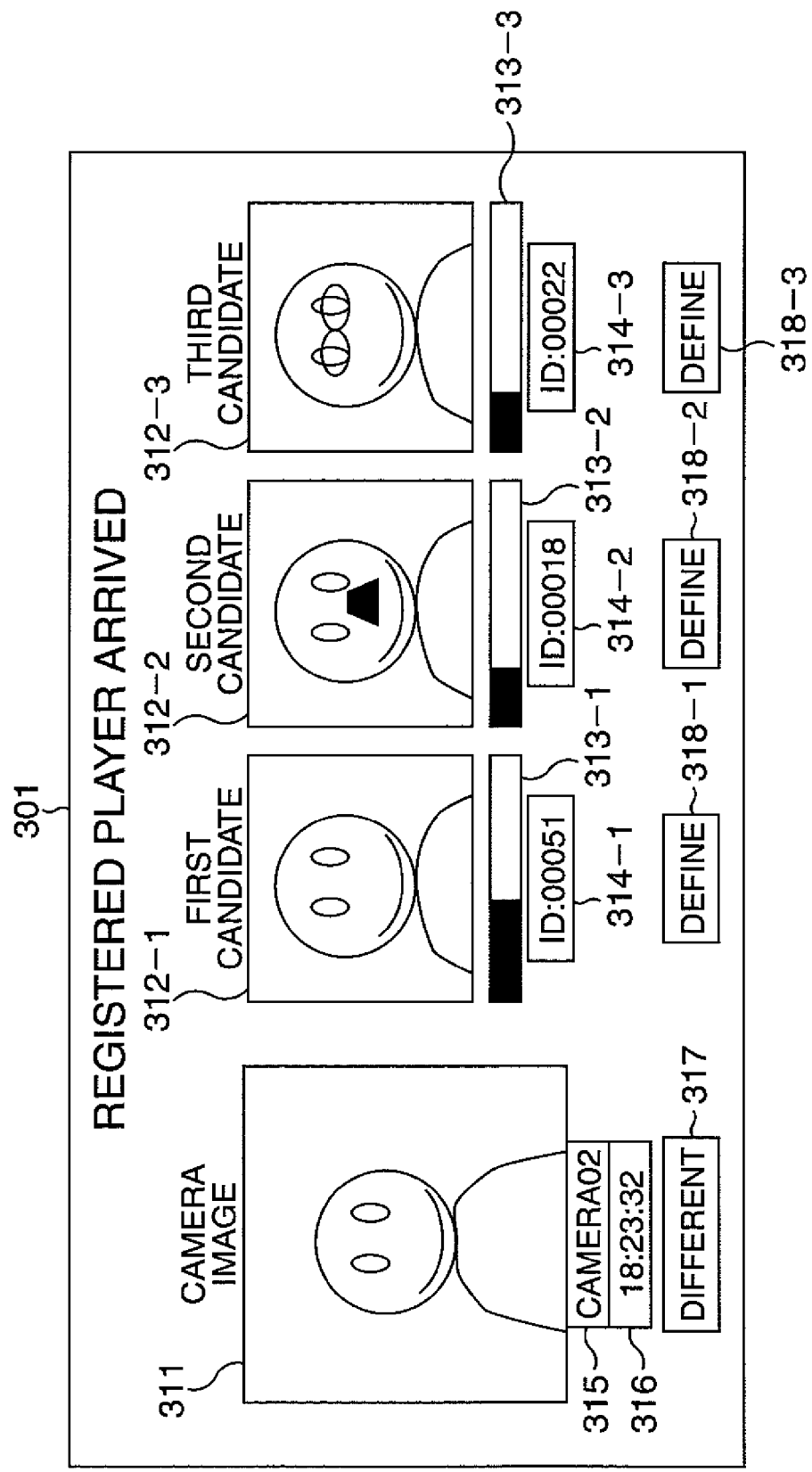
FIG. 15 is a diagram depicting a display example of a notified image.

At this time, a notification screen 301, as shown in FIG. 15, for example, is displayed on the display section 23.

In the notification screen 301 in FIG. 15, the camera image display sections 311 are created in the middle part at the left side, where the facial image supplied by the image processing unit 60 is displayed. At the right thereof, the facial image display sections 312-1 to 312-3 for the top three registered players having highest similarity, that is, the first candidate to the third candidate, are created in the sequence of higher similarity. Similarity level display sections 313-1 to 313-3 are created below the facial image display section 312-1 to 312-3 of each registered player, where the levels of similarity are displayed. In FIG. 15, the horizontal length of the black area indicates the level of similarity.

ID display sections 314-1 to 314-3 are created below the similarity level display sections 313-1 to 313-3 at corresponding positions, where an ID for identifying each facial image in the biological information DB 22 of each facial images is displayed, that is "00051", "00018" and "00022" in the case of FIG. 15.

Define buttons 318-1 to 318-3, operated by the operation section 225 to select each candidate, are created below the ID display sections 314-1 to 314-3, at respective corresponding positions.

A camera ID display section 315 is created below the camera image display section 311, for identifying a camera which captured the facial image, and in FIG. 15, "camera 02" is displayed as the camera ID to identify the camera 45, entrance camera 59 and in-store camera 61. The time display section 316 is created below the camera ID display section 315, where time, when the image was captured by the entrance camera 59, is displayed, and in FIG. 15, "18:23:32" is displayed, which means the facial image of the camera image display section 311 was captured at 18:23:32.

The different person button 317 is created below the time display section 316, and is operated by the operation section 225 when the facial image of this camera image is regarded as not similar to any of the first to third candidate registered players in the facial display sections 312-1 to 312-3.

In step S27, the communication section 224 judges whether the operation section 225 was operated and whether any of the candidate facial images was selected. In other words, it is judged whether any of the define buttons 318-1 to 318-3 was operated by the operation section 225 when the notification screen 301 shown in FIG. 15 is displayed on the display section 23.

If a define button 318-1 was operated in step S27, for example, then it is regarded that the first candidate facial image is selected, and in step S28, the communication section 224 sends the selected first candidate facial image and the camera image captured by the entrance camera 59 to the portable terminal 20, so as to notify that a corresponding registered player has arrived.

In step S41, the communication section 271 judges whether the arrival of a registered player was notified, and repeats this processing until receiving notice. For example, in step S41, if arrival of a registered player is notified by the processing in step S28, then the communication section 271 receives the notice on the arrival of the registered player sent from the biological information recognition device 21 in step S42, and supplies the facial image of the registered player which was sent along with the notice and the camera image captured by the entrance camera 59 to the image processing section 272. The image processing section 272 processes the information on the selected facial image and the camera image captured by the entrance camera 59 into information in a format that can be displayed on the display section 273, and has the display section 273 display it in step S43.

By the above processing, the staff of the game center 1, who have portable terminals 20, can recognize the arrival of the registered player.

Also in step S29, the facial image acquisition section 221 judges whether processing was performed for all the supplied facial images, and if there is an unprocessed facial image, the processing returns to step S22. In other words, the processings in step S22 to S30 are repeated until all the facial images are processed. When it is judged that processing is completed for all the facial images, the processing returns to step S21.

If no candidate facial images are selected in step S27 and a different person button 317 is pressed in the notification screen 301 in FIG. 15, for example, or if the highest similarity is not greater than a predetermined threshold according to the information on the top three facial images and their similarities supplied from the similarity calculation section 232 in step S25, that is, if the similarity is less than the predetermined threshold, even if the facial image of the registered player has the highest similarity, then in step S30, the similarity judgment section 233 supplies the facial image supplied from the image processing unit 60 to the unregistered player database registration section 223. The unregistered player database registration section 223 supplies the facial image of the unregistered player to the database management section 226, and has the database management section 226 register it in the biological information DB 22.

Figure 16:
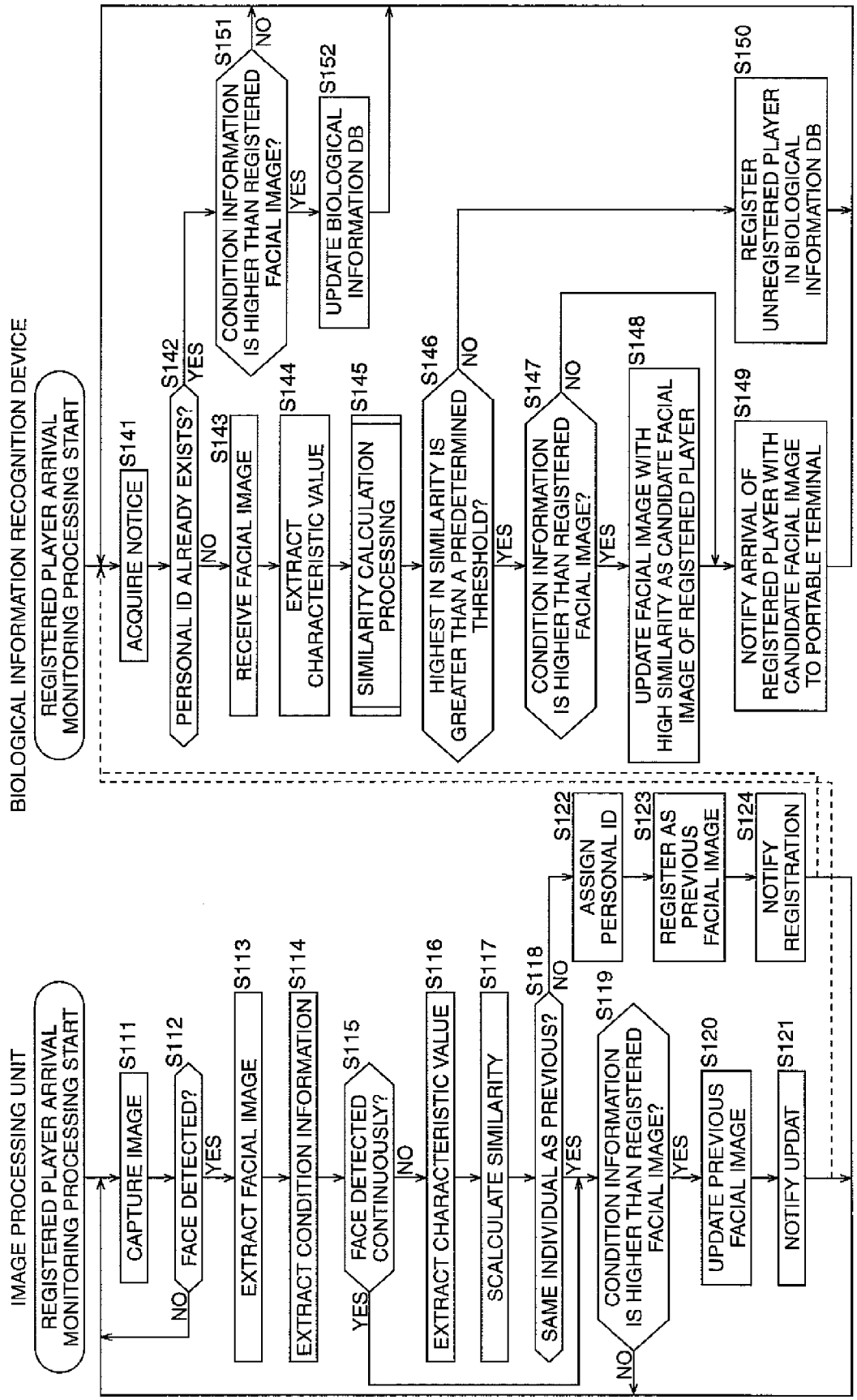
FIG. 16 is a flow chart depicting a registered player arrival monitoring processing.

Now the registered player arrival monitoring processing when the facial image, having a personal ID supplied from the image processing unit 43 installed near the game machine 42, is supplied to the biological information recognition device 21, will be described with reference to the flow chart in FIG. 16. The processings of steps S149 and S150 in FIG. 16 are the same as the processings in step S28 and S30 described with reference to FIG. 13, so description thereof is omitted.

In step S111, the camera 45 captures an image in a range near the installed game machine 42, and supplies the captured image to the image processing unit 43. The image acquisition section 201 of the image processing unit 43 acquires the supplied image, and supplies it to the facial image extraction section 202.

In step S112, the facial image extraction section 202 tries to extract the facial image of a player from the supplied image, and judges whether the facial image was extracted, and if the facial image cannot be extracted, the processing returns to step S111. In other words, the processings in step S111 and S112 are repeated until the facial image is extracted. For example, if an image of a player is captured by the camera 45 in step S112 when the player sits in front of the game machine 42, for example, and if the facial image of the sitting player is extracted from the captured image, the facial image extraction section 202 extracts the facial image, and supplies it to the collation section 203 and the update judgment section 205 in step S113.

In step S114, the condition extraction section 205a of the update judgment section 205 extracts the condition information, and converts it into a score based on the supplied facial image and the previous facial image stored in the local biological information DB 207. More specifically, the condition extraction section 205a extracts conditions to extract the characteristic value from the supplied facial image and previous facial image, such as information on the direction of a face which can be estimated by the size of the facial image and extracting such organs as eyes, nose and mouth, and the brightness of a facial image in general. To be more concrete, the condition extraction section 205a uses the number of pixels where the facial image is displayed as a score for the size of the facial image. The condition extraction section 205a also uses the angle of the direction of the face estimated by extracting organs, for example, as a score. The condition extraction section 205a also uses the total number of pixels constituting the facial image as a score.

In step S115, the continuation judgment section 205c sequentially stores two continuous facial pictures to be supplied, compares the previous facial image and supplied facial image, and judges whether the captured facial image is continuous. More specifically, the continuation judgment section 205c determines a absolute difference sum between each pixel in the two continuously stored facial images, and regards them as continuous if the absolute difference sum is smaller than the predetermined threshold, and it is judged that facial images change and are not continuous if the absolute difference sum is greater than the predetermined threshold.

If it is judged that the acquisition of the facial image is not continuous in step S115, the facial image is different from the previously captured facial image, so it is regarded that either the players playing at game machine 42 switched, or the direction of the face changed greatly, and in step S116, the characteristic value extraction section 211 of the collation section 203 extracts the characteristic value from the supplied facial image, and supplies it to the similarity calculation section 212 along with the supplied facial image.

In step S117, the similarity calculation section 212 of the collation section 203 calculates the similarity based on the supplied characteristic value, and characteristic value of the facial image in the previous facial image which is registered in the local biological information DB 207, and supplies it to the similarity judgment section 213 along with the supplied facial image.

In step S118, the similarity judgment section 213 of the collation section 203 compares the supplied similarity and the predetermined threshold, and judges whether the similarity is greater than the predetermined threshold or not, that is, whether the previous facial image and facial image supplied this time are those of a same individual, and supplies the judgment result to the update judgment section 205, and also supplies the supplied facial image to the communication section 204.

In step S118, if it is judged that the facial image supplied this time is not the same individual as the previous facial image, that is, if it is regarded that the previous player moved away from the game machine 42 and a new player sat down, then the ID assignment section 205d sets a new personal ID, and supplies it to the communication section 204 in step S122.

In step S123, the update judgment section 205 assigns the issued personal ID to the supplied facial image, and instructs the database management section 206 to register the facial image as the previous facial image in the local biological information DB 207, and also store information on the previous facial image of the individual in the local biological information DB 207, to the local biological information DB 208, corresponding to the personal ID.

In step S124, the communication section 204 assigns the personal ID supplied from the information update judgment section 205 to the facial image supplied from the collation section 203, along with such information as the camera ID for identifying each camera 45-1 to 45-m and the transmission time, and supplies these to the biological information recognition device 21, and processing returns to step S111.

In other words, by this processing, the facial image of the new player, who sat in front of the game machine 42 and started playing, is registered in the local biological information DB 207 as the previously captured facial image, and the registered facial image is supplied to the biological information recognition device 21, along with the personal ID.

On the other hand, if it is judged that the facial images were not acquired continuously in step S115, or if it is judged that the facial image is of the same individual as the previous facial image in step S118, then in step S119 the comparison section 205b of the update judgment section 205 compares the score values of the condition information between the supplied facial image and the previous facial image, based on the condition information extracted by the condition extraction section 205a, and judges whether condition information is better for the supplied facial image than the previous facial image.

When the condition information is better for the supplied facial image than the previous facial image in step S119, for example, the update judgment section 205 controls the database management section 206, and updates the facial image registered in the local biological information DB 207 to the supplied facial image in step S120. In other words, by this processing, a facial image to be registered in the local biological information DB 207 is sequentially updated to a new facial image having better condition information, that is, a facial image of which characteristic value can be more easily extracted.

In step S121, the update judgment section 205 supplies the personal ID of this facial image to the communication section 204. The communication section 204 attaches the personal ID supplied from the update judgment section to the facial image supplied from the collation section 203, along with such information as the camera ID for identifying each of the cameras 45-1 to 45-m and the transmission time, and supplies these to the biological information recognition device 21, and processing returns to step S111.

In step S141, the facial image acquisition section 221 acquires the facial image including the personal ID supplied from the image processing unit 43.

In step S142, the personal ID judgment section 221a accesses the biological information DB 22, searches the facial images registered corresponding to the personal ID assigned to the facial images, and judges whether the personal ID assigned to the supplied facial image is registered or not, that is, whether the supplied facial image is a registered facial image.

In step S142, if the facial image has not been registered in the biological information DB 22 and the personal ID does not exist there, for example, then the facial image acquisition section 221 of the biological information recognition device 21 acquires the facial image in step S143. In step S143, the facial image acquisition section 221 supplies the supplied facial image to the characteristic value extraction section 231 of the collation section 222.

In step S144, the characteristic value extraction section 231 of the collation section 222 extracts the characteristic value from the supplied facial image, and supplies it to the similarity calculation section 232, along with the facial image.

In step S145, the similarity calculation section 232 executes the similarity calculation processing. The similarity calculation processing is the same as the processing in FIG. 15, so description thereof is omitted.

In step S146, the similarity judgment section 233 extracts information on the highest facial image and similarity, out of the facial images registered in the biological information DB 22, based on the similarity calculation result. Then based on the information on the highest facial image and similarity, the similarity judgment section 233 judges whether the highest similarity is greater than a predetermined threshold. In other words, the similarity judgment section 233 compares the similarity of the most similar registered player (registered player who is most similar to the facial image acquired by the facial image acquisition section 221 out of the facial images registered in the biological information DB 22, in this case the registered player having the highest similarity) with a predetermined threshold.

If it is judged that the highest similarity is greater than the predetermined threshold in step S146, the similarity judgment section 233 supplies the highest facial image supplied from the similarity calculation section 232 to the condition extraction section 228 in step S147. The condition extraction section 228 extracts the condition information, which indicates how easily the characteristic value can be extracted, for the facial image supplied from the image processing unit 43 and the facial image having the highest similarity, and supplies them to the comparison section 229, along with the respective facial image. The comparison section 229 judges whether the score of the condition information on the facial image supplied from the image processing unit 43 is higher than the score of the condition information on the facial image having the highest similarity.

In step S147, if the score of the condition information on the facial image supplied from the image processing unit 43 is higher than the score of the condition information on the facial image having the highest similarity, for example, the comparison section 229 supplies the facial image acquired by the facial image acquisition section 221 to the database management section 226 in step S148, and has the database management section 226 update so that the facial image having the highest similarity which was supplied from the similarity judgment section 233 becomes the image having the highest similarity, among the images registered in the biological information DB 22. At this time, the personal ID of the registered facial image is registered together.

On the other hand, if the score of the condition information on the facial image supplied from the image processing unit 43 is lower than the score of the condition information on the facial image having the highest similarity in step S147, this means that the facial image having the highest similarity is a facial image of which characteristic value can be more easily extracted than the facial image supplied from the image processing unit 43, so the processing in step S148 is skipped, assuming that the facial image registered in the biological information DB 22 is continuously used.

If it is judged that the highest similarity is lower than the predetermined threshold in step S146, the processing moves to step S150.

A facial image having the highest similarity among the facial images registered in the biological information DB 22 by the above processing is very likely a facial image supplied from the image processing unit 43, so if the score of the condition information is high, this facial image is newly stored in the biological information DB 22, instead of the facial image registered in the biological information DB 22, so as to improve the recognition accuracy.

If the supplied facial image is a facial image previously registered in the biological information DB 22, and the personal ID already exists in the biological information DB 22 in step S142, the facial image acquisition section 221 supplies the acquired facial image to the condition extraction section 228 in step S151. Then the condition extraction section 228 extracts condition information for extracting characteristic value from the acquired facial image and the facial image which has the same personal ID and is registered in the biological information DB 22 respectively, and supplies them to the comparison section 229. The comparison section 229 compares the scores of the condition information respectively, and judges whether the score of the acquired facial image is higher than the facial image registered in the biological information DB 22.

If it is judged that the score of the acquired facial image is higher than the facial image registered in the biological information DB 22 in step S151, the comparison section 229 updates the facial image with the personal ID registered in the biological information DB 22 to the acquired facial image in step S152.

On the other hand, if it is judged that the score of the acquired facial image is lower than the facial image registered in the biological information DB 22 in step S151, the processing in step S152 is skipped.

By the above processing, if the facial image having a same personal ID as the personal ID of the facial image supplied by the image processing unit 43 has already been registered in the biological information DB 22, and the condition information on the facial image supplied from the image processing unit 43 is higher than the facial image already registered in the biological information DB 22, the facial image is sequentially updated, so with every update the collation accuracy of the facial image can be improved.

As described above, in the image processing unit 43, only facial images having optimum condition information for extracting the characteristic value, out of the facial images captured by the camera 45 installed in front of game machine 42, are supplied to the biological information recognition device 21, so the load of facial image authentication processing in the biological information recognition device 21 can be decreased. In the image processing unit 43, a facial image having higher condition information is sequentially updated by repeating collation with the previous facial image based on the local biological information DB 207, so the accuracy of the similarity judgment processing in the image processing unit 43 can also be improved, hence only facial images having more advantageous conditions to extract characteristic value can be supplied to the biological information recognition device 21.

In the biological information recognition device 21, the facial image are registered for each personal ID, so the facial image having better condition information supplied from the image processing unit 43 is sequentially updated and registered in the biological information DB 22, hence facial image recognition accuracy in similarity judgment in the biological information recognition device 21 can be improved.

Also the processing load of the server related to the collation processing system implemented by a server, which performs collation processing with the facial image registered in the database, can be decreased, and collation accuracy can be improved.

The above mentioned series of monitoring processing can be executed not only by hardware, but also by software. If the series of processing is executed by software, the programs constituting the software is built into dedicated hardware of a computer, or various programs are installed on a general purpose personal computer from a recording media, so as to execute various functions.

Figure 17:
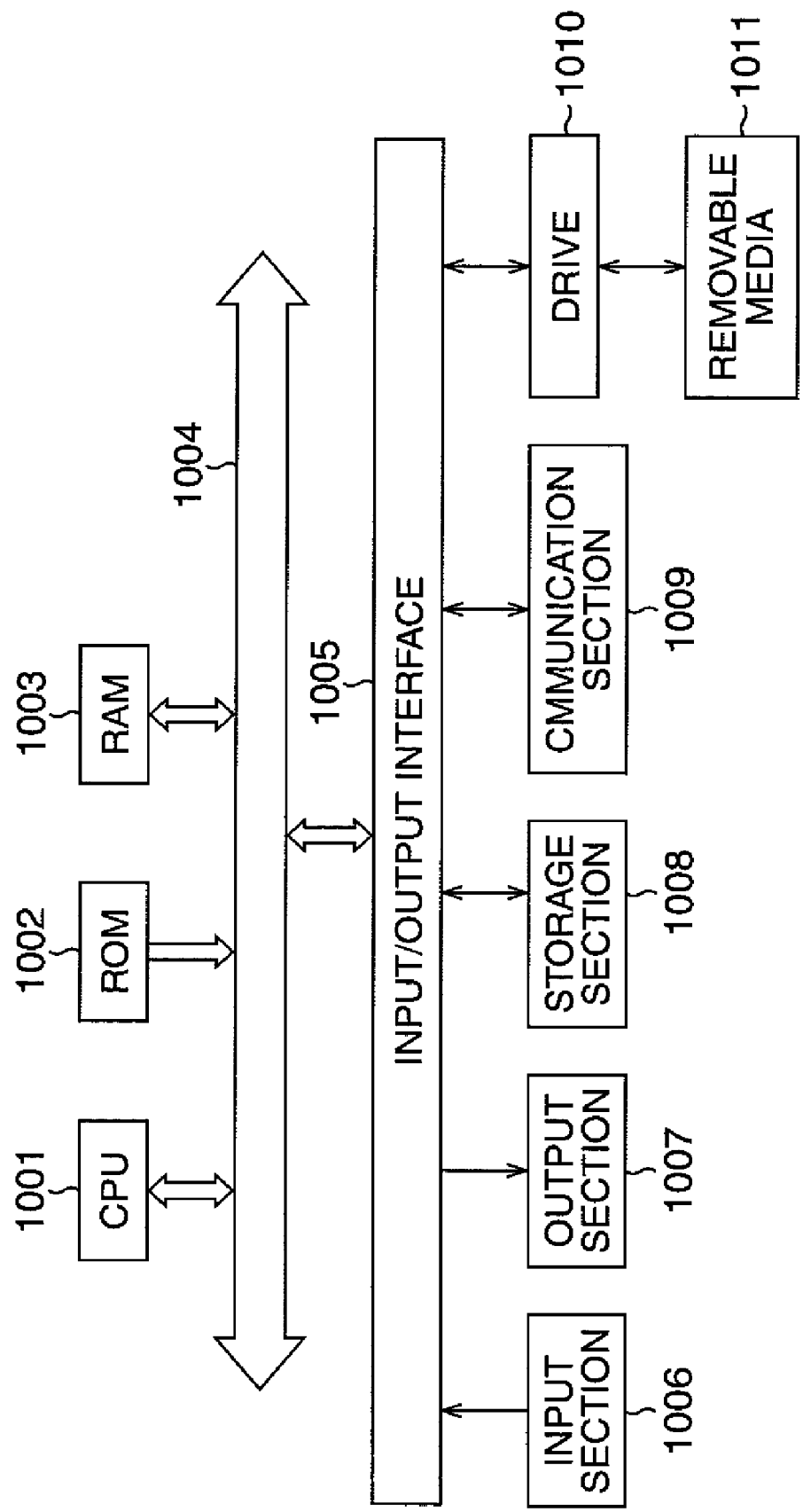
FIG. 17 is a diagram depicting a configuration example of a personal computer.

FIG. 17 shows a configuration example of a general purpose personal computer. This personal computer encloses a CPU (Central Processing Unit) 1001. An input/output interface 1005 is connected to the CPU 1001 via a bus 1004. A ROM (Read Only Memory) 1002 and RAM (Random Access Memory) 1003 are connected to this bus 1004.

An input section 1006 comprised of such an input device as a mouse, an output section 1007 for outputting to a processing operation screen and processing result image on the display device, a storage section 1008 comprised of a hard disk drive for storing programs and various data, and a communication section 1009 which comprises a LAN (Local Area Network) adapter, for example, and executes communication processing via a network, typically the Internet, are connected to the input/output interface 1005. Also a drive 1010 to read and write data from/to a magnetic disk (including a flexible disk), optical disk (including a CD-ROM (Compact Disc-Read Only Memory)) and DVD (Digital Versatile Disc), magneto-optical disk (including an MD (Mini Disc)) or such removable media 1011 as a semiconductor memory, is connected.

The CPU 1001 executes various processings according to programs which are read from the programs stored in the ROM 1002, or to programs which are read from a magnetic disk, optical disk, magneto-optical disk, or such a removable media 1011 as a semiconductor memory, and are installed in the storage section 1008, and are loaded from the storage section 1008 to the RAM 1003. Data required for the CPU 1001 to execute various processings is also stored in the RAM 1003.

In the present description, the steps describing the programs recorded on the recording media include not only the processings executed in a time series according to the described sequence, but also include processings which are not processed in a time series, but are processed in parallel or independently.

In the present description, a "system" refers to the entire system comprised of a plurality of devices.

What is claimed is:

1. A monitoring system comprising an information processing device for acquiring a facial image and a monitoring device for performing monitoring processing based on an image supplied from said information device, wherein said information processing device comprises:
acquisition means for acquiring a facial image of an individual who approaches a game machine as a facial image of a collation object;
collation object storage means for storing a predetermined number of facial images of said collation object;
condition information extraction means for extracting condition information which indicates conditions for extracting characteristic value of said facial image based on the facial image of said collation object acquired by said acquisition means and the facial image of the collation object stored by said collation object storage means;
condition information comparison means for comparing the condition information on the facial image acquired by said acquisition means and the condition information on the facial image of the collation object stored by said collation object storage means, based on the condition information extracted by said condition information extraction means; and
transmission means for sending the facial image acquired by said acquisition means to said monitoring device when the condition information on the facial image acquired by said acquisition means is better than the condition information on the facial image of the collation object stored by said collation object storage means according to said condition information comparison means, wherein said monitoring device comprises:
reception means for receiving the facial image of said collation object which is sent by said transmission means;
storage means for storing the facial image of a registered individual in a registered individual database;
first similarity collation means for calculating a similarity of the facial image of the collation object received by said reception means and the facial image of the registered individual stored by said storage means, and performing collation;
first similarity judgment means for judging whether the facial image of said collation object is the facial image of said registered individual by comparing the similarity which is a collation result of said first similarity collation means and a predetermined threshold;
notification means for notifying that said collation object is said registered individual when the facial image of said collation object is the facial image of said registered individual based on a judgment result of said first similarity judgment means; and
update means wherein when the condition information on the facial image acquired by said acquisition means is better than the condition information on the facial image of the collation object stored by said collation object storage means according to said condition information comparison means, said collation object storage section is updated by deleting a facial image of which said condition information is lowest from a predetermined number of facial images stored in said collation object storage means, and storing the facial image acquired by said acquisition means as a facial image of said collation object.

2. A monitoring system comprising an information processing device for acquiring a facial image and a monitoring device for performing monitoring processing based on an image supplied from said information processing device, wherein said information processing device comprises:
acquisition means for acquiring a facial image of an individual who approaches a game machine as a facial image of a collation object;
collation object storage means for storing a predetermined number of facial images of said collation object;
condition information extraction means for extracting condition information which indicates conditions for extracting characteristic value of said facial image based on the facial image of said collation object acquired by said acquisition means and the facial image of the collation object stored by said collation object storage means;

condition information comparison means for comparing the condition information on the facial image acquired by said acquisition means and the condition information on the facial image of the collation object stored by said collation object storage means, based on the condition information extracted by said condition information extraction means; and transmission means for sending the facial image acquired by said acquisition means to said monitoring device when the condition information on the facial image acquired by said acquisition means is better than the condition information on the facial image of the collation object stored by said collation object storage means according to said condition information comparison means, wherein said monitoring device comprises:

reception means for receiving the facial image of said collation object which is sent by said transmission means;

storage means for storing the facial image of a registered individual in a registered individual database;

first similarity collation means for calculating a similarity of the facial image of the collation object received by said reception means and the facial image of the registered individual stored by said storage means, and performing collation;

first similarity judgment means for judging whether the facial image of said collation object is the facial image of said registered individual by comparing the similarity which is a collation result of said first similarity collation means and a predetermined threshold; and notification means for notifying that said collation object is said registered individual when the facial image of said collation object is the facial image of said registered individual based on a judgment result of said first similarity judgment means, and wherein said information processing device further comprises a second similarity collation means for calculating similarity of the facial image of the collation object acquired by said acquisition means and the facial image of the collation object stored by said collation object storage means and performing collation, and second similarity judgment means for judging whether the facial image of the collation object acquired by said acquisition means is the facial image of the collation object stored by said collation object storage means based on a comparison of the similarity which is a collation result by said second similarity collation means and a predetermined threshold, wherein said condition information comparison means compares the condition information on the facial image acquired by said acquisition means and the condition information on the facial image of the collation object stored by said collation object storage means, based on the condition information extracted by said condition information extraction means when the facial image of the collation object acquired by said acquisition means is the facial image of the collation object stored in said collation object storage means according to a judgment result of said second similarity judgment means, and wherein said transmission means sends the facial image acquired by said acquisition means to said monitoring device when the condition information on the facial image acquired by said acquisition means is better than the condition information on the facial image of the collation object stored by said collection object storage means according to said condition information comparison means.

3. A monitoring system comprising an information processing device for acquiring a facial image and a monitoring device for performing monitoring processing based on an image supplied from said information processing device, wherein the monitoring system executes a monitoring method, comprising:

an acquisition step of acquiring a facial image of an individual who approaches a game machine as a facial image of a collation object;

a collation object storage step of storing a predetermined number of facial images of said collation object;

a condition information extraction step of extracting condition information which indicates conditions for extracting characteristic value of said facial image based on the facial image of said collation object acquired by the processing of said acquisition step and the facial image of the collation object stored in a database management section by the processing of said collation object storage step;

a condition information comparison step of comparing the condition information on the facial image acquired by the processing of said acquisition step and the condition information on the facial image of the collation object stored by the processing of said collation object storage step based on the condition information extracted by the processing of said condition information extraction step; and a transmission step, which is performed using a communication section, of sending the facial image acquired by the processing of said acquisition step to said monitoring device when the condition information on the facial image acquired by the processing of said acquisition step is better than the condition information on the facial image of the collation object stored by the processing of said collation object storage step according to the processing of said condition information comparison step, wherein the monitoring method of said monitoring device further comprises:

a reception step of receiving the facial image of said collation object which is sent by the processing of said transmission step; a storage step of storing the facial image of a registered individual in a registered individual database;

a first similarity collation step of calculating a similarity of the facial image of the collation object received by the processing of said reception step and the facial image of the registered individual stored by the processing of said storage step, and performing collation;

a first similarity judgment step of judging whether the facial image of said collation object is the facial image of said registered individual by comparing the similarity which is the collation result in the processing of said first similarity collation step and a predetermined threshold; and a notification step for notifying that said collation object is said registered individual when the facial image of said collation object is the facial image of said registered individual based on a judgment result in the processing of said first similarity judgment step, and wherein the monitoring system further comprises update means wherein when the condition information on the facial image acquired by said acquisition means is better than the condition information on the facial image of the collation object stored by said collation object storage means according to said condition information comparison means, said collation object storage section is updated by deleting a facial image of which said condition information is lowest from a predetermined number of facial images stored in said collation object storage means, and storing the facial image acquired by said acquisition means as a facial image of said collation object.

4. A program stored on a non-transitory computer-readable medium for a computer which controls a monitoring system comprising an information processing device for acquiring a facial image and a monitoring device for performing monitoring processing based on an image supplied from said information processing device, the program causing the computer which controls said information processing device to execute:
- an acquisition step of acquiring a facial image of an individual who approaches a game machine as a facial image of a collation object;
- a collation object storage step of storing a predetermined number of facial images of said collation object;
- a condition information extraction step of extracting condition information which indicates conditions for extracting characteristic value of said facial image based on the facial image of said collation object acquired by the processing of said acquisition step and the facial image of the collation object stored by the processing of said collation object storage step;
- a condition information comparison step of comparing the condition information on the facial image acquired by the processing of said acquisition step and the condition information on the facial image of the collation object stored by the processing of said collation object storage step based on the condition information extracted by the processing of said condition information extraction step; and
- a transmission step of sending the facial image acquired by the processing of said acquisition step to said monitoring device when the condition information on the facial image acquired by the processing of said acquisition step is better than the condition information on the facial image of the collation object stored by the processing of said collation object storage step according to the processing of said condition information comparison step, and the program causing the computer which controls said monitoring device to execute:
- a reception step of receiving the facial image of said collation object which is sent by the processing of said transmission step;
- a storage step of storing the facial image of a registered individual in a registered individual database;
- a first similarity collation step of calculating a similarity of the facial image of the collation object received by the processing of said reception step and the facial image of the registered individual stored by the processing of said storage step, and performing collation;
- a first similarity judgment step of judging whether the facial image of said collation object is the facial image of said registered individual by comparing the similarity which is a collation result of the processing of said first similarity collation step and a predetermined threshold; and
- a notification step of notifying that said collation object is said registered individual when the facial image of said collation object is the facial image of said registered individual based on the judgment result in the processing of said first similarity judgment step, wherein the monitoring system further comprises update means wherein when the condition information on the facial image acquired by said acquisition means is better than the condition information on the facial image of the collation object stored by said collation object storage means according to said condition information comparison means, said collation object storage section is updated by deleting a facial image of which said condition information is lowest from a predetermined number of facial images stored in said collation object storage means, and storing the facial image acquired by said acquisition means as a facial image of said collation object.

5. The monitoring system according to claim 1,
wherein said information processing device further comprises image capturing means for capturing images, and facial image extraction means for extracting a facial image of said collation object from the images captured by said capturing means,
said monitoring device further comprises characteristic value extraction means for extracting characteristic value from the facial image of said collation object,
said reception means receives the facial image of said collation object extracted by said facial image extraction means, and
said first similarity collation means calculates similarity using the facial image of the collation object received by said reception means and characteristic value of the facial image of a registered individual stored in said storage means, and collates the facial image of the collation object received by said reception means and the facial image of the registered individual stored in said storage means.

* * * * *